(12) United States Patent  
Syundo

(10) Patent No.: US 7,527,746 B2  
(45) Date of Patent: May 5, 2009

(54) LIQUID CRYSTAL POLYFUNCTIONAL ACRYLATE DERIVATIVE AND POLYMER THEREOF

(75) Inventor: Ryushi Syundo, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 586 days.

(21) Appl. No.: 11/315,874

(22) Filed: Dec. 22, 2005

(65) Prior Publication Data

US 2006/0172090 A1    Aug. 3, 2006

(30) Foreign Application Priority Data

Jan. 28, 2005    (JP) .............................. 2005-020955

(51) Int. Cl.
*C09K 19/00* (2006.01)
*C09K 19/06* (2006.01)
*C09K 19/52* (2006.01)

(52) U.S. Cl. ................. 252/299.01; 252/299.6; 430/20; 428/1.1; 428/1.2; 428/1.3

(58) Field of Classification Search ............ 252/299.01, 252/299.6; 430/20; 428/1.1–1.3
See application file for complete search history.

(56) References Cited

U.S. PATENT DOCUMENTS

2006/0054859 A1*  3/2006  Shundo et al. ......... 252/299.01

FOREIGN PATENT DOCUMENTS

| DE | 196 40 619 | 4/1998 |
|----|------------|--------|
| GB | 2 338 240 | 12/1999 |
| JP | 07-017910 | 1/1995 |
| JP | 07-258638 | 10/1995 |
| JP | 08-003111 | 1/1996 |
| JP | 09-316032 | 12/1997 |
| JP | 2004-231638 | 8/2004 |
| JP | 2005-060373 | 3/2005 |
| JP | 2005-097281 | 4/2005 |
| JP | 2005-206579 | 8/2005 |
| WO | WO 95/07308 | 3/1995 |
| WO | WO 97/34862 | 9/1997 |

OTHER PUBLICATIONS

Pages 94-97 of the Introduciton to Polarizing Microscope for Polymer Materials Published by Agne Gijutsu Center Co., Ltd. 2001.

* cited by examiner

*Primary Examiner*—Geraldina Visconti  
(74) *Attorney, Agent, or Firm*—J.C. Patents

(57) ABSTRACT

A compound represented by the following general formula (1a) or (1b), a liquid crystal composition containing the compound, and a polymer obtained by polymerizing the compound or the composition:

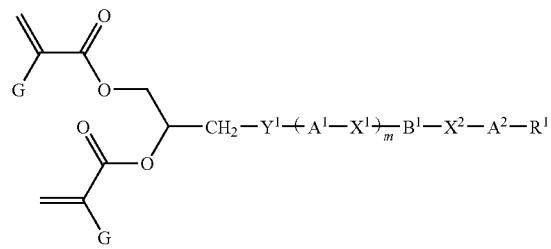

(1a)

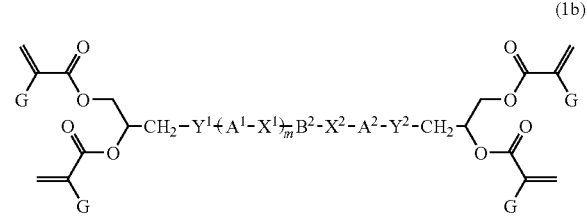

(1b)

wherein $R^1$ represents a fluorine atom, an alkyl group or the like; $Y^1$ and $Y^2$ each independently represents alkylene or the like; $A^1$, $A^2$, $B^1$ and $B^2$ each independently represents 1,4-cyclohexylene, 1,4-phenylene or the like; $X^1$ and $X^2$ each independently represents a single bond, —COO—, —OCO— or the like; m represents 0, 1 or 2; and G represents hydrogen, methyl or the like.

21 Claims, No Drawings

LIQUID CRYSTAL POLYFUNCTIONAL ACRYLATE DERIVATIVE AND POLYMER THEREOF

BACKGROUND OF THE INVENTION

1. Field of the Invention

The present invention relates to a liquid crystal compound having at least two acryloyloxy groups on a side chain thereof, a composition containing the compound, a polymer obtained from the compound, and use thereof.

2. Description of the Related Art

In recent years, a liquid crystal compound having polymerizability is utilized as a polymer having optical anisotropy for a polarizing plate, a retardation plate and the like. This is because the compound has optical anisotropy in a liquid crystal state, and the orientation of molecules in the liquid crystal is fixed through polymerization. Optical characteristics that are required for the polymer having optical anisotropy vary depending on targets, and it is important to provide such a compound that has characteristics adapted to purpose. The compound is generally used after converted to a polymer and then molded. In the compound used in this manner, characteristics of a polymer thereof, in addition to the optical anisotropy, are important. The characteristics include a polymerization rate, and transparency, mechanical strength, coating property, solubility, a degree of crystallinity, contraction property, water permeability, water absorbency, a melting point, a glass transition point, a clearing point and chemical resistance of the polymer.

Various kinds of liquid crystal compounds having polymerizability have been known (for example, in JP-A-7-17910, JP-A-8-3111 and JP-A-9-316032). However, the conventional compounds have room for improvement in such characteristics as liquid crystallinity, compatibility with another compound and optical anisotropy. Furthermore, polymers thereof may not always have appropriate heat resistance, mechanical strength and chemical resistance. Accordingly, there have been demands of development of such a compound that is excellent in various properties including a high maximum temperature of the liquid crystal phase, a low minimum temperature of the liquid crystal phase, a wide temperature range of the liquid crystal phase and excellent compatibility, and such a polymer that is obtained by using the compound and is excellent in various properties including heat resistance, mechanical strength and chemical resistance.

A first object of the invention is to provide a polymerizable liquid crystal compound that has necessary characteristics, such as optical anisotropy, and a polymerizable liquid crystal composition that contains the compound. A second object of the invention is to provide a polymer that is excellent in plural characteristics including heat resistance, mechanical strength and chemical resistance, and a molded article having optical anisotropy that is obtained by using the polymer. A third object of the invention is use of the polymer utilizing the characteristics thereof. A fourth object of the invention is to provide a liquid crystal display device containing the polymer. The aforementioned and other objects of the invention will be apparent from the following description.

SUMMARY OF THE INVENTION

The invention relates to a compound represented by the following general formula (1a) or (1b), a liquid crystal composition containing the compound, and a polymer obtained by polymerizing the compound or the composition:

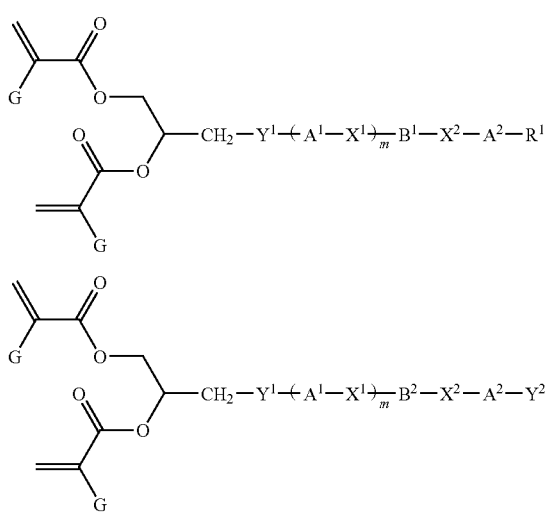

(1a)

(1b)

wherein $R^1$ represents a hydrogen atom, a fluorine atom, a chlorine atom, —CN, —NO$_2$ or an alkyl group having from 1 to 20 carbon atoms, provided that in the alkyl group, an arbitrary hydrogen atom may be replaced by a fluorine atom or a chlorine atom, and arbitrary one or two —CH$_2$— groups may be replaced by —O—, —S—, —COO—, —OCO—, —CO—, —CH=CH— or —C≡C—, in which $R^1$ may be an optically active group; $Y^1$ and $Y^2$ each independently represents an alkylene group having from 1 to 20 carbon atoms, provided that in the alkylene group, an arbitrary hydrogen atom may be replaced by a fluorine atom or a chlorine atom, an arbitrary —CH$_2$— may be replaced by —O—, arbitrary one or two —CH$_2$— groups may be replaced by —COO— or —OCO—, and arbitrary one —CH$_2$— may be replaced by —CH=CH— or —C≡C—, in which $Y^1$ and $Y^2$ each may be an optically active group; $A^1$, $A^2$, $B^1$ and $B^2$ each independently represents a group selected from 1,4-cyclohexylene, 1,4-phenylene, pyridine-2,5-diyl, pyrimidine-2,5-diyl, naphthalene-2,6-diyl, tetrahydronaphthalene-2,6-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl, 9,9-difluorofluorene-2,7-diyl, and groups represented by the following formulae (K1), (K2) and (K3), provided that in the 1,4-phenylene group, an arbitrary hydrogen atom may be replaced by a fluorine atom or a chlorine atom, and arbitrary one or two hydrogen atoms may be replaced by a cyano group, a methyl group, a methoxy group, a hydroxyl group, a formyl group, an acetoxy group, an acetyl group, a trifluoroacetyl group, a difluoromethyl group or a trifluoromethyl group; $X^1$ and $X^2$ each independently represents a single bond, —COO—, —OCO—, —OCH$_2$—, —CH$_2$O—, —CONH—, —NHCO—, —CH=CH—COO—, —OOC—HC=CH—, —(CH$_2$)$_2$—COO—, —OOC—(CH$_2$)$_2$—, —(CH$_2$)$_2$— or —C≡C—; m represents 0, 1 or 2, provided that when m is 2, two groups represented by $A^1$ may be the same groups or different groups, and two groups represented by $X^1$ may be the same groups or different groups; and G represents a hydrogen atom, a fluorine atom, a methyl group, a cyano group or a trifluoromethyl group, provided that plural groups represented by G may be the same groups or different groups:

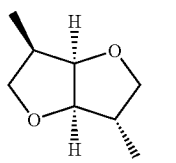

(K1)

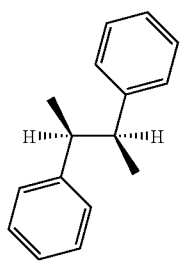

(K2)

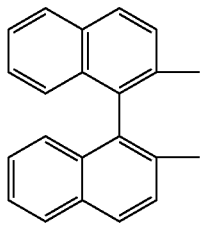

(K3)

DETAILED DESCRIPTION OF THE INVENTION

The compound of the invention is a liquid crystal molecule having two or four acryloyloxy groups. The compound has excellent compatibility with another polymerizable liquid crystal compound and further has necessary characteristics, such as optical anisotropy. The polymer of the invention is obtained by polymerizing the compound. The polymer has large surface hardness and excellent heat resistance owing to the highly dense crosslinked structure thereof. A molded article obtained by using the polymer has an optical anisotropy and can be suitably used, for example, as a phase difference film of a liquid crystal display device.

The terms used in the specification are as follows. The term "liquid crystal compound" is a general term for a compound having a liquid crystal phase and a compound having no liquid crystal phase but being useful as a component of a liquid crystal composition. The term "liquid crystal phase" includes a nematic phase, a smectic phase, a cholesteric phase and the like, and means a nematic phase in many cases. The term "polymerizability" means such a capability that a monomer is polymerized by such means as light, heat and a catalyst to provide a polymer. A liquid crystal compound, a liquid crystal composition and a liquid crystal display device may occasionally abbreviated as a compound, a composition and a device, respectively. The formulae (1a) and (1b) may occasionally referred generically to as the formula (1). The compounds represented by the formula (1), the formula (M1), the formula (M2), and the formula (M3) may occasionally referred to as a compound (1), a compound (M1), a compound (M2), and a compound (M3) respectively. A polymer obtained from a composition containing the compound (1) may occasionally referred to as a polymer (1) The term "(meth)acryloyloxy" means "acryloyloxy or methacryloyloxy". The term "(meth)acrylate" means "acrylate or methacrylate". The term "(meth)acrylic acid" means "acrylic acid or methacrylic acid".

The inventors have conceived of such an idea that two or four acryloyloxy groups as a polymerizable group are attached to a side chain of a liquid crystal molecule, and the resulting compound is polymerized to obtain a polymer having been crosslinked highly densely and having an optical anisotropy. The inventors have made studies based on the idea, and have obtained unexpectedly favorable results. The invention including the following items (1) to (18) has been completed through extensive investigations made by the inventors based on the results.

(1) A compound represented by the following general formula (1a) or (1b):

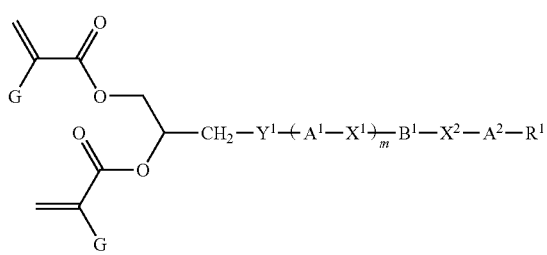

(1a)

-continued

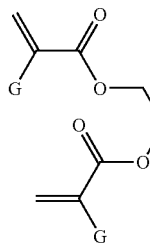 —CH$_2$—Y$^1$—(A$^1$—X$^1$)$_m$—B$^2$—X$^2$—A$^2$—Y$^2$—CH$_2$— 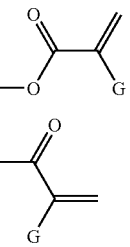

(1b)

The formulae (1a) and (1b) use the symbols including A$^1$, B$^1$ and Y$^1$. Two or more occurrence of the symbol A$^1$ may have the same meaning or different meanings. This rule is also applied to the symbols X$^1$ and G. This rule is also applied to the other formulae.

In the formulae (1a) and (1b), R$^1$ represents a hydrogen atom, a fluorine atom, a chlorine atom, —CN, —NO$_2$ or an alkyl group having from 1 to 20 carbon atoms, provided that in the alkyl group, an arbitrary hydrogen atom may be replaced by a fluorine atom or a chlorine atom, and arbitrary one or two —CH$_2$— groups may be replaced by —O—, —S—, —COO—, —OCO—, —CO—, —CH=CH— or —C≡C—, and in this case, R$^1$ may be an optically active group.

In the alkyl group, a hydrogen atom may be replaced by a fluorine atom or the like, and simultaneously —CH$_2$— may be replaced by —O— or the like. In other words, R$^1$ includes an alkyl group, in which a hydrogen atom is replaced by a fluorine atom or the like, and —CH$_2$— is replaced by —O—. Examples of the meaning of the phrase "in the alkyl group, arbitrary one or two —CH$_2$— groups may be replaced by —O—, —CH=CH— or the like" will be described below. Examples of C$_4$H$_9$—, in which arbitrary one or two —CH$_2$— groups are replaced by —O—, —CH=CH— or the like include C$_3$H$_7$O—, CH$_3$—O—(CH$_2$)$_2$—, CH$_3$—O—CH$_2$—O—, H$_2$C=CH—(CH$_2$)$_3$—, CH$_3$—CH=CH—(CH$_2$)$_2$— and CH$_3$—CH=CH—CH$_2$—O—. That is, the term "arbitrary" means that the group is selected in a random manner. In other words, the term "arbitrary" means that "not only the position but also the number can be freely selected". For example, the expression "arbitrary A may be replaced by B, C, D or E" has not only two meanings, i.e., one A may be replaced by B, C, D or E, and any of plural A's may be replaced by any one of B, C, D or E, but also a further meaning, i.e., at least two selected from A replaced by B, A replaced by C, A replaced by D and A replaced by E may be present as a mixture. In consideration of the stability of the compound, CH$_3$—O—CH$_2$—O— having oxygen atoms not adjacent to each other is preferred than CH$_3$—O—O—CH$_2$— having oxygen atoms adjacent to each other. The expression "may be replaced by" has the same meaning in other cases where the expression is applied to other groups and compounds.

Preferred examples of R$^1$ include a fluorine atom, a chlorine atom, —CN, —NO$_2$, —OCF$_3$, an alkyl group having from 1 to 15 carbon atoms and an alkoxy group having from 1 to 15 carbon atoms, more preferred examples of R$^1$ include a fluorine atom, a chlorine atom, —CN, —OCF$_3$, an alkyl group having from 1 to 15 carbon atoms and an alkoxy group having from 1 to 15 carbon atoms, and in this case, R$^1$ may be an optically active group. More preferred examples of R$^1$ include a fluorine atom, —CN, —OCF$_3$, an alkyl group having from 1 to 13 carbon atoms and an alkoxy group having from 1 to 13 carbon atoms, and in this case, R$^1$ may be an optically active group. Particularly preferred examples of R$^1$ include —CN, —OCF$_3$, an alkyl group having from 1 to 10 carbon atoms and an alkoxy group having from 1 to 10 carbon atoms, and in this case, and specific examples of the alkyl group having from 1 to 10 carbon atoms and the alkoxy group having from 1 to 10 carbon atoms include a methyl group, an ethyl group, a propyl group, a butyl group, a pentyl group, a hexyl group, a heptyl group, an octyl group, a nonyl group, a decyl group, a methoxy group, an ethoxy group, a propyloxy group, a butoxy group, a pentyloxy group, a hexyloxy group, a heptyloxy group, an octyloxy group, a nonyloxy group and a decyloxy group.

Y$^1$ and Y$^2$ each independently represents an alkylene group having from 1 to 20 carbon atoms, provided that in the alkylene group, an arbitrary hydrogen atom may be replaced by a fluorine atom or a chlorine atom, an arbitrary —CH$_2$— may be replaced by —O—, arbitrary one or two —CH$_2$— groups may be replaced by —COO— or —OCO—, and arbitrary one —CH$_2$— may be replaced by —CH=CH— or —C≡C—, and in this case, Y$^1$ and Y$^2$ each may be an optically active group.

Preferred examples of Y$^1$ and Y$^2$ each independently include —O—, —(CH$_2$)$_r$—, —O—(CH$_2$)$_r$—, —(CH$_2$)$_r$—O—, —O—(CH$_2$)$_r$—O— and —O—(CH$_2$CH$_2$O)$_s$—, wherein r represents an integer of from 1 to 10, and s represents an integer of from 1 to 5. More preferred examples of Y$^1$ and Y$^2$ include —O—, —(CH$_2$)$_r$—, —O—(CH$_2$)$_r$—, —(CH$_2$)$_r$—O—, —O—(CH$_2$)$_r$—O— and —O—(CH$_2$CH$_2$O)$_s$—, wherein r represents an integer of from 2 to 10, and s represents an integer of from 1 to 5, and in this case, Y$^1$ and Y$^2$ each may be an optically active group. Further preferred examples of Y$^1$ and Y$^2$ include a group represented by the following general formula (Y3):

(Y3)

wherein X$^3$ represents a single bond or —O—, and q represents an integer of from 0 to 10.

Preferred specific examples of Y$^1$ and Y$^2$ include —O—, —CH$_2$—O—, —CH$_2$CH$_2$—O—, —CH$_2$CH$_2$CH$_2$—O—, —CH$_2$CH$_2$CH$_2$CH$_2$—O—, —CH$_2$CH$_2$CH$_2$CH$_2$CH$_2$—O—, —CH$_2$CH$_2$CH$_2$CH$_2$CH$_2$CH$_2$—O—, —CH$_2$CH$_2$CH$_2$CH$_2$CH$_2$CH$_2$CH$_2$—O—, —CH$_2$CH$_2$CH$_2$CH$_2$CH$_2$CH$_2$CH$_2$CH$_2$—O—, —CH$_2$CH$_2$CH$_2$CH$_2$CH$_2$CH$_2$CH$_2$CH$_2$CH$_2$—O—, —CH$_2$CH$_2$CH$_2$CH$_2$CH$_2$CH$_2$CH$_2$CH$_2$CH$_2$CH$_2$—O—, —O—CH$_2$—O—, —O—CH$_2$CH$_2$—O—, —O—CH$_2$CH$_2$CH$_2$—O—, —O—CH$_2$CH$_2$CH$_2$CH$_2$—O—, —O—CH₂CH₂CH₂CH₂CH₂—O—,
—O—CH₂CH₂CH₂CH₂CH₂CH₂—O—,
—O—CH₂CH₂CH₂CH₂CH₂CH₂CH₂—O—,
—O—CH₂CH₂CH₂CH₂CH₂CH₂CH₂CH₂—O—,
—O—CH₂CH₂CH₂CH₂—O— and
—O—CH₂CH₂CH₂CH₂CH₂CH₂CH₂CH₂CH₂CH₂—O—.

$A^1$, $A^2$, $B^1$ and $B^2$ each independently represents a group selected from 1,4-cyclohexylene, 1,4-phenylene, pyridine-2,5-diyl, pyrimidine-2,5-diyl, naphthalene-2,6-diyl, tetrahydronaphthalene-2,6-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl, 9,9-difluorofluorene-2,7-diyl, and groups represented by the following formulae (K1), (K2) and (K3), provided that in the 1,4-phenylene group, an arbitrary hydrogen atom may be replaced by a fluorine atom or a chlorine atom, and arbitrary one or two hydrogen atoms may be replaced by a cyano group, a methyl group, a methoxy group, a hydroxyl group, a formyl group, an acetoxy group, an acetyl group, a trifluoroacetyl group, a difluoromethyl group or a trifluoromethyl group.

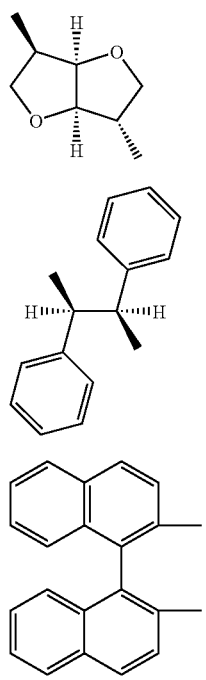

(K1)

(K2)

(K3)

Preferred examples of $A^1$, $A^2$, $B^1$ and $B^2$ each independently include a group selected from 1,4-cyclohexylene, 1,4-phenylene, naphthalene-2,6-diyl, fluorene-2,7-diyl, 9-methylfluorene-2,7-diyl, 9-ethylfluorene-2,7-diyl, 9,9-dimethylfluorene-2,7-diyl, and groups represented by the following formulae (K1), (K2) and (K3), provided that in the 1,4-phenylene group, an arbitrary hydrogen atom may be replaced by a fluorine atom, arbitrary one hydrogen atom may be replaced by a methyl group, a trifluoromethyl group, a methoxy group, an acetoxy group or an acetyl group, and arbitrary two hydrogen atoms may be replaced by a trifluoromethyl group.

More preferred examples of $A^1$ and $A^2$ each independently include 1,4-cyclohexylene, 1,4-phenylene, 2-fluoro-1,4-phenylene, 2,5-difluoro-1,4-phenylene, 2,6-difluoro-1,4-phenylene, 2-methyl-1,4-phenylene and 2-trifluoromethyl-1,4-phenylene, and further preferred examples of $A^1$ and $A^2$ each independently include 1,4-cyclohexylene, 1,4-phenylene, 2-fluoro-1,4-phenylene and 2-methyl-1,4-phenylene.

More preferred examples of $B^1$ and $B^2$ each independently include 1,4-cyclohexylene, 1,4-phenylene, naphthalene-2,6-diyl, fluorene-2,7-diyl, 9-methylfluorene-2,7-diyl, 9-ethylfluorene-2,7-diyl, 9,9-dimethylfluorene-2,7-diyl, 2-fluoro-1,4-phenylene, 2,3-difluoro-1,4-phenylene, 2,3,5,6-tetrafluoro-1,4-phenylene, 2-methyl-1,4-phenylene, 2-trifluoromethyl-1,4-phenylene, 2-methoxy-1,4-phenylene, 2-acetyl-1,4-phenylene and 2,3-ditrifluoromethyl-1,4-phenylene, and further preferred examples of $B^1$ and $B^2$ each independently include 1,4-cyclohexylene, 1,4-phenylene, 9-methylfluorene-2,7-diyl, 9,9-dimethylfluorene-2,7-diyl, 2-fluoro-1,4-phenylene, 2-methyl-1,4-phenylene, 2-trifluoromethyl-1,4-phenylene and 2,3-ditrifluoromethyl-1,4-phenylene.

These cyclic structures may be bonded in a horizontally reversed manner in the formula (1). In the case where the compound (1) has a 4-cyclohexylene structure, the steric configuration thereof is preferably a trans configuration rather than a cis configuration. The compound (1) may contain an isotope, such as $^2H$ (deuterium) and $^{13}C$, in such an amount that is larger than the naturally occurring amount, which may bring about no significant difference in characteristics of the compound.

$X^1$ and $X^2$ each independently represents a single bond, —COO—, —OCO—, —OCH₂—, —CH₂—, —CONH—, —NHCO—, —CH═CH—COO—, —OOC—HC═CH—, —(CH₂)₂—COO—, —OOC—(CH₂)₂—, —(CH₂)₂— or —C≡C—.

Preferred examples of $X^1$ and $X^2$ each independently include a single bond, —COO—, —OCO—, —CH═CH—COO—, —OOC—HC═CH—, —(CH₂)₂—COO—, —OOC—(CH₂)₂—, —(CH₂)₂— and —C≡C—, and more preferred examples of $X^1$ and $X^2$ each independently include a single bond, —COO— and —OCO—.

m represents 0, 1 or 2, provided that when m is 2, two groups represented by $A^1$ may be the same groups or different groups, and two groups represented by $X^1$ may be the same groups or different groups. m preferably represents 0 or 1.

G represents a hydrogen atom, a fluorine atom, a methyl group, a cyano group or a trifluoromethyl group, provided that plural groups represented by G may be the same groups or different groups. Preferred examples of G include a methyl group, a fluorine atom and a hydrogen atom, and more preferred examples of G include a hydrogen atom.

(2) The compound according to the item (1), wherein in the formulae (1a) and (1b), $R^1$ represents a fluorine atom, a chlorine atom, —CN, —NO₂, —OCF₃, an alkyl group having from 1 to 15 carbon atoms or an alkoxy group having from 1 to 15 carbon atoms; $Y^1$ and $Y^2$ each independently represents —O—, —(CH₂)$_r$—, —O—(CH₂)$_r$—, —(CH₂)$_r$—O—, —O—(CH₂)$_r$—O— and —O—(CH₂CH₂O)$_s$—, wherein r represents an integer of from 1 to 10, and s represents an integer of from 1 to 5; $A^1$, $A^2$, $B^1$ and $B^2$ each independently represents a group selected from 1,4-cyclohexylene, 1,4-phenylene, naphthalene-2,6-diyl, fluorene-2,7-diyl, 9-methylfluorene-2,7-diyl, 9-ethylfluorene-2,7-diyl, 9,9-dimethylfluorene-2,7-diyl, and groups represented by the following formulae (K1), (K2) and (K3), provided that in the 1,4-phenylene group, an arbitrary hydrogen atom may be replaced by a fluorine atom, arbitrary one hydrogen atom may be replaced by a methyl group, a trifluoromethyl group, a methoxy group, an acetoxy group or an acetyl group, and arbitrary two hydrogen atoms may be replaced by a trifluoromethyl group; $X^1$ and $X^2$ each independently represents a single bond, —COO—, —OCO—, —CH=CH—COO—, —OOC—HC=CH—, —(CH$_2$)$_2$—COO—, —OOC—(CH$_2$)$_2$—, —(CH$_2$)$_2$— or —C≡C—; m represents 0 or 1; and G represents a methyl group, a fluorine atom or a hydrogen atom.

(3) A compound represented by one of the following general formulae (3) to (6):

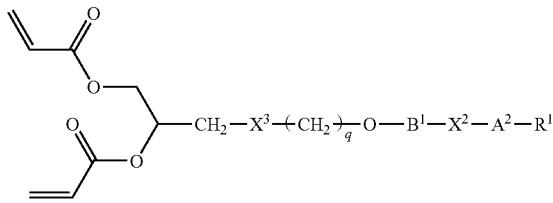

(3)

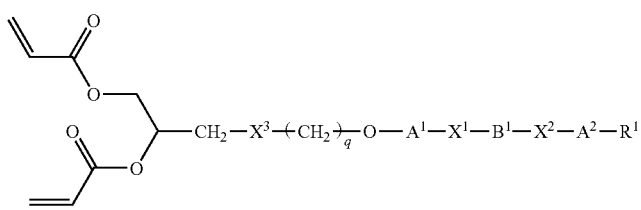

(4)

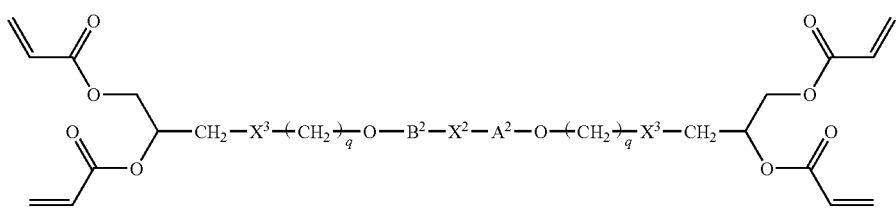

(5)

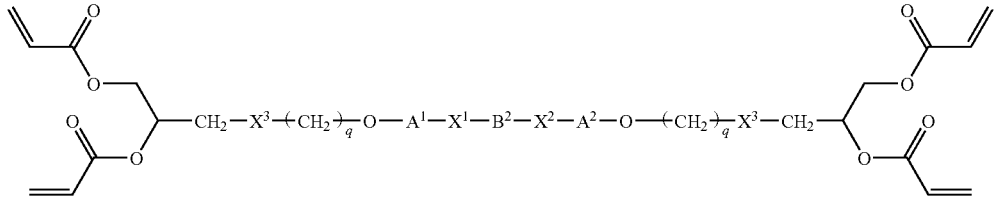

(6)

wherein $R^1$ represents —CN, —OCF$_3$, an alkyl group having from 1 to 10 carbon atoms or an alkoxy group having from 1 to 10 carbon atoms; $A^1$ and $A^2$ each independently represents 1,4-cyclohexylene, 1,4-phenylene, 2-fluoro-1,4-phenylene, 2,5-difluoro-1,4-phenylene, 2,6-difluoro-1,4-phenylene, 2-methyl-1,4-phenylene or 2-trifluoromethyl-1,4-phenylene; $B^1$ and $B^2$ each independently represents 1,4-cyclohexylene, 1,4-phenylene, naphthalene-2,6-diyl, fluorene-2,7-diyl, 9-methylfluorene-2,7-diyl, 9-ethylfluorene-2,7-diyl, 9,9-dimethylfluorene-2,7-diyl, 2-fluoro-1,4-phenylene, 2,3-difluoro-1,4-phenylene, 2,3,5,6-tetrafluoro-1,4-phenylene, 2-methyl-1,4-phenylene, 2-trifluoromethyl-1,4-phenylene, 2-methoxy-1,4-phenylene, 2-acetyl-1,4-phenylene or 2,3-ditrifluoromethyl-1,4-phenylene; $X^1$ and $X^2$ each independently represents a single bond, —COO—, —OCO—, —CH=CH—COO—, —OOC—HC=CH—, —(CH$_2$)$_2$—COO—, —OOC—(CH$_2$)$_2$—, —(CH$_2$)$_2$— or —C≡C—; $X^3$ represents a single bond or —O—; and q represents an integer of from 0 to 10, provided that plural groups represented by $X^3$ may be the same groups or different groups, and plural integers represented by q may be the same or different.

(4) The compound according to the item (3), wherein in the formulae (3) to (6), $R^1$ represents —CN, —OCF$_3$, an alkyl group having from 1 to 10 carbon atoms or an alkoxy group having from 1 to 10 carbon atoms; $A^1$ and $A^2$ each independently represents 1,4-cyclohexylene, 1,4-phenylene, 2-fluoro-1,4-phenylene or 2-methyl-1,4-phenylene; $B^1$ and $B^2$ each independently represents 1,4-cyclohexylene, 1,4-phenylene, 9-methylfluorene-2,7-diyl, 9,9-dimethylfluorene-2,7-diyl, 2-fluoro-1,4-phenylene, 2-methyl-1,4-phenylene, 2-trifluoromethyl-1,4-phenylene or 2,3-ditrifluoromethyl-1,4-phenylene; $X^1$ and $X^2$ each independently represents a single bond, —COO— or —OCO—; $X^3$ represents a single bond or —O—; and q represents an integer of from 0 to 10.

(5) The compound according to the item (3), wherein the compound is represented by the formula (3), and in the formula (3), $R^1$ represents —CN; $A^2$ represents 1,4-phenylene; $B^1$ represents 1,4-phenylene; $X^2$ represents a single bond; $X^3$ represents a single bond or —O—; and q represents an integer of from 0 to 10.

(6) The compound according to the item (3), wherein the compound is represented by the formula (5), and in the formula (5), $A^2$ represents 1,4-phenylene; $B^2$ represents 1,4-phenylene; $X^2$ represents —COO—; $X^3$ represents a single bond or —O—; and q represents an integer of from 0 to 10.

(7) The compound according to the item (3), wherein the compound is represented by the formula (6), and in the formula (6), $A^1$ and $A^2$ each represents 1,4-phenylene; $B^2$ represents 1,4-phenylene, 9-methylfluorene-2,7-diyl or 2-methyl-1,4-phenylene; $X^1$ and $X^2$ each independently represents —COO— or —OCO—; $X^3$ represents a single bond or —O—; and q represents an integer of from 0 to 10.

(8) A composition containing, as a first component, at least one of the compound according to one of items (1) and (2).

(9) A composition containing, as a first component, at least one of the compound according to one of items (3) to (7).

(10) The composition according to the item (9) wherein the composition further contains, as a second component, a polymerizable compound that is different from the compounds according to the items (1) to (7).

(11) The composition according to the item (10) wherein the second component is at least one compound selected from the group consisting of compounds represented by the following formulae (M1), (M2) and (M3):

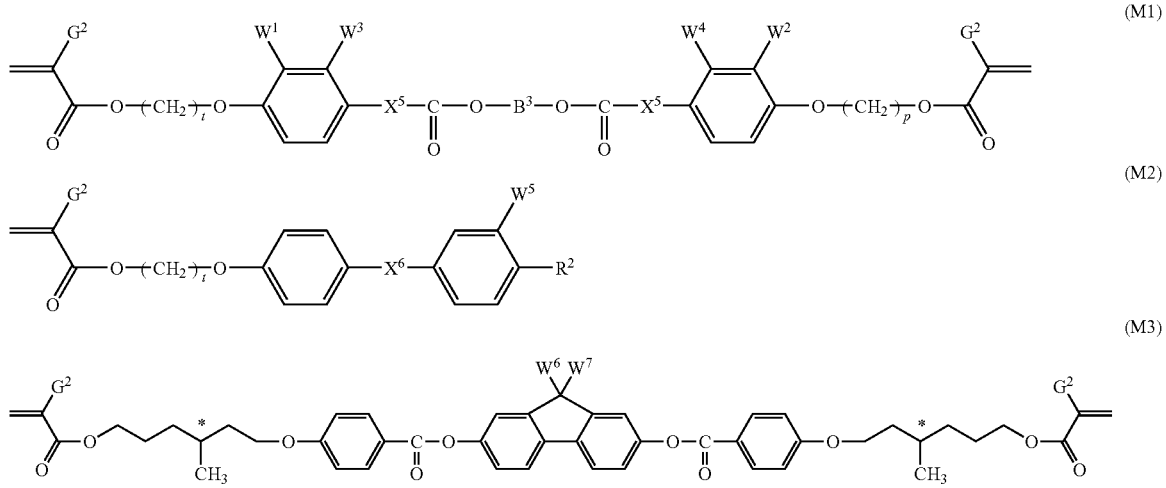

wherein $B^3$ represents 1,4-phenylene, 2-fluoro-1,4-phenylene, 2-methyl-1,4-phenylene, 2-trifluoromethyl-1,4-phenylene, 2,3-ditrifluoro-1,4-phenylene, naphthalene-2,6-diyl, 9-methylfluorene-2,7-diyl, 9-ethylfluorene-2,7-diyl or 9,9-dimethylfluorene-2,7-diyl; $R^2$ represents a fluorine atom, —$OCF_3$, —CN, an alkyl group having from 1 to 20 carbon atoms or an alkoxy group having from 1 to 20 carbon atoms; $X^5$ each independently represents a single bond, —$(CH_2)_2$— or —C≡C—; $X^6$ represents a single bond, —COO—, —OCO—, —CH=CH—COO—, —OOC—HC=CH— or —C≡C—; p and t each independently represents an integer of from 1 to 20; $G^2$ represents a hydrogen atom, a fluorine atom, a methyl group or a trifluoromethyl group; $W^1$, $W^2$, $W^3$, $W^4$ and $W^5$ each independently represents a hydrogen atom or a fluorine atom; and $W^6$ and $W^7$ each independently represents a hydrogen atom or a methyl group, provided that a carbon atoms attached with an asterisk is a asymmetric carbon atom, plural groups represented by $X^5$ may be the same groups or different groups, plural integers represented by t may be the same or different, and plural groups represented by $G^2$ may be the same groups or different groups.

(12) The composition according to the item (11) wherein the composition contains, as the first component, at least one compound selected from the group consisting of the compound represented by the formula (6) according to the item (3), in the formula (6), $A^1$ and $A^2$ each represents 1,4-phenylene; $B^2$ represents 1,4-phenylene, 9-methylfluorene-2,7-diyl or 2-methyl-1,4-phenylene; $X^1$ and $X^2$ each independently represents —COO— or —OCO—; $X^3$ represents a single bond or —O—; and q represents an integer of from 0 to 10, and as the second component, at least one compound selected from the group consisting of the compound represented by the formula (M1), in the formula (M1), $B^3$ represents 1,4-phenylene, 2-methyl-1,4-phenylene, 2,3-ditrifluoro-1,4-phenylene, 9-methylfluorene-2,7-diyl or 9,9-dimethylfluorene-2,7-diyl; $X^5$ represents a single bond or —$(CH_2)_2$—; p and t each independently represents an integer of from 1 to 20; $G^2$ represents a hydrogen atom; and $W^1$, $W^2$, $W^3$ and $W^4$ each independently represents a hydrogen atom or a fluorine atom, and a content of the first component is from 20 to 80% by weight, and a content of the second component is from 20 to 80% by weight, with respect to a total amount of the first and second components being 100% by weight.

(13) The composition according to the item (11), wherein the composition contains, as the first component, at least one compound selected from the group consisting of the compound represented by the formula (6) according to the item (3), in the formula (6), $A^1$ and $A^2$ each represents 1,4-phenylene; $B^2$ represents 1,4-phenylene, 9-methylfluorene-2,7-diyl or 2-methyl-1,4-phenylene; $X^1$ and $X^2$ each independently represents —COO— or —OCO—; $X^3$ represents a single bond or —O—; and q represents an integer of from 0 to 10, and as the second component, at least one compound selected from the group consisting of the compound represented by the formula (M3), in the formula (M3), $G^2$ represents a hydrogen atom; and $W^6$ and $W^7$ each independently represents a hydrogen atom or a methyl group, and a content of the first component is from 20 to 80% by weight, and a content of the second component is from 20 to 80% by weight, with respect to a total amount of the first and second components being 100% by weight.

(14) A polymer obtained by polymerizing the compound according to one of the items (1) to (7).

(15) A polymer obtained by polymerizing the composition according to one of the items (8) to (13).

(16) A molded article having optical anisotropy containing the polymer according to the item (14) or (15).

(17) A liquid crystal display device containing the molded article according to the item (16).

(18) Use of the polymer according to the item (14) or (15) as a molded article having optical anisotropy.

DESCRIPTION OF THE PREFERRED EMBODIMENTS

The compound of the invention will be described. The compound (1a) or (1b) has the following characteristics.

(a) The compound (1a) is a polymerizable liquid crystal compound having two acryloyloxy groups or α-substituted acryloyloxy groups on a side chain or the liquid crystal skeleton.

(b) The compound (1b) is a polymerizable liquid crystal compound having four acryloyloxy groups or α-substituted acryloyloxy groups on a side chain or the liquid crystal skeleton.

(c) The compounds (1a) and (1b) are physically and chemically stable and have good compatibility with another compound under conditions under which the compounds are generally used.

(d) The compounds (1a) and (1b) can be adjusted in physical properties including a large dielectric anisotropy, a small dielectric anisotropy, a large optical anisotropy, a small optical anisotropy and a small viscosity by appropriately selecting the ring, the bonding group and the side chain constituting the compounds.

(e) The compounds (1a) and (1b) have two or four acryloyloxy groups or α-substituted acryloyloxy groups per one liquid crystal molecule skeleton, whereby the compounds provide a highly dense crosslinked structure through polymerization.

In the case where $R^1$ is an alkyl group or an alkoxy group, the temperature range of the liquid crystal phase can be adjusted by the length of the alkyl part. In the case where $R^1$ is a fluorine atom or a chlorine atom, such an effect can be expected that the melting point of the compound (1) can be decreased. In the case where $R^1$ is an optically active group, the composition can be imparted with helical twist power.

In the case where at least one of $X^1$ and $X^2$ is —COO—, —OCO—, —CH=CH—COO— or —OOC—CH=CH—, there is such a tendency that the compound is improved in liquid crystal property, and in the case where at least one of $X^1$ and $X^2$ is —C≡C—, there is such a tendency that a compound having a large optical anisotropy can be obtained.

In the case where G is a methyl group, a fluorine atom or a hydrogen atom, the compound can be easily polymerized.

A target property can be imparted to the compound (1) by appropriately selecting the ring, the side chain, the bonding group and the polymerizable group.

The synthesis method of the compounds (1a) and (1b) will be described. In order to synthesize the compound (1a), a monofunctional liquid crystal epoxy compound (EP1) is used as a raw material. In order to synthesize the compound (1b), a bifunctional liquid crystal epoxy compound (EP2) is used as a raw material. The compounds (EP1) and (EP2) can be easily synthesized by the methods disclosed in the following literatures 1 to 9.

Literature 1: *Macromol. Chem. Phys.*, vol. 196, p. 3415 (1995)

Literature 2: JP-A-7-258638

Literature 3: International Publication No. 95/7308

Literature 4: International Publication No. 97/34862

Literature 5: West German Patent No. 19,640,619

Literature 6: British Patent No. 2,338,240

Literature 7: *Macromolecules*, vol. 26, p. 1244 (1993)

Literature 8: *Polymer*, vol. 35, No. 3, p. 622 (1994)

Literature 9: JP-A-2005-60373(US-A-2005-31801)

The monofunctional epoxy compound (EP1) or the bifunctional epoxy compound (EP2) is then reacted with an acrylic acid derivative (Ac1), such as acrylic acid, methacrylic acid, trifluoromethacrylic acid and α-fluoroacrylic acid, to obtain a corresponding acrylic adduct (epoxy acrylate). The reaction is carried out at a temperature range of from 50 to 150° C. for a period of from 1 to 8 hours. A catalyst is preferably used in the reaction. Examples of the catalyst include an amine compound, such as triethylamine, dimethylbutylamine and tri-n-butylamine, a quaternary ammonium salt, such as tetramethylammonium salt, tetraetylammonium salt, tetrabutylammonium salt and benzyltriethylammonium salt, a quaternary phosphonium salt, a phosphine compound, such as triphenylphosphine, an imidazole compound, such as 2-methylimidazole and 2-methyl-4-methylimidazole, an alkaline earth metallic salt, such as magnesium hydroxide, magnesium acetate, magnesium(meth)acrylate, magnesium chloride, zinc hydroxide, zinc acetate, zinc (meth)acrylate and zinc chloride, and an oxide of an alkaline earth metal, such as magnesium oxide and zinc oxide. These catalysts may be used solely or in combination of plural kinds thereof. The reaction may be carried out in the presence or absence of a solvent. Examples of the solvent include benzene, toluene, xylene, hexane, heptane, octane, cyclohexane, acetone, 2-butanone, methyl isobutyl ketone, dipropyl ether, dipropylene glycol diethyl ether, ethyl acetate and butyl acetate. It is preferred that the reaction is carried out in the presence of a polymerization inhibitor for preventing the resulting epoxy acrylate from being polymerized. In order to improve the polymerization inhibiting effect, it is preferred that a mixed gas of air or oxygen with argon is introduced into the reaction mixture. Examples of the polymerization inhibitor include hydroquinone, p-methoxyphenol, 2,4-dimethyl-t-butylphenol, 3-hydroxythiophenol, p-benzoquinone, 2,5-dihydroxy-p-benzoquinone, t-butylcatechol, diphenylenediamine, phenyl-α-naphthylamine, diethanolamine, triethanolamine, phenothiazine, copper powder, copper dithiocarbamate, copper oxide, cuprous chloride, copper sulfate, sulfur and ferric chloride. These compounds may be used solely or in combination of plural kinds thereof.

The epoxy acrylate is once isolated without purification, and then reacted with an acrylic acid chloride derivative (Ac2), such as acrylic acid chloride, methacrylic acid chloride, trifluoromethacrylic acid chloride and α-fluoroacrylic acid chloride, in the presence of a base, to synthesize the compound (1a) or (1b). Examples of the base include triethylamine, tributylamine, pyridine, dimethylaminopyridine and dimethylaniline.

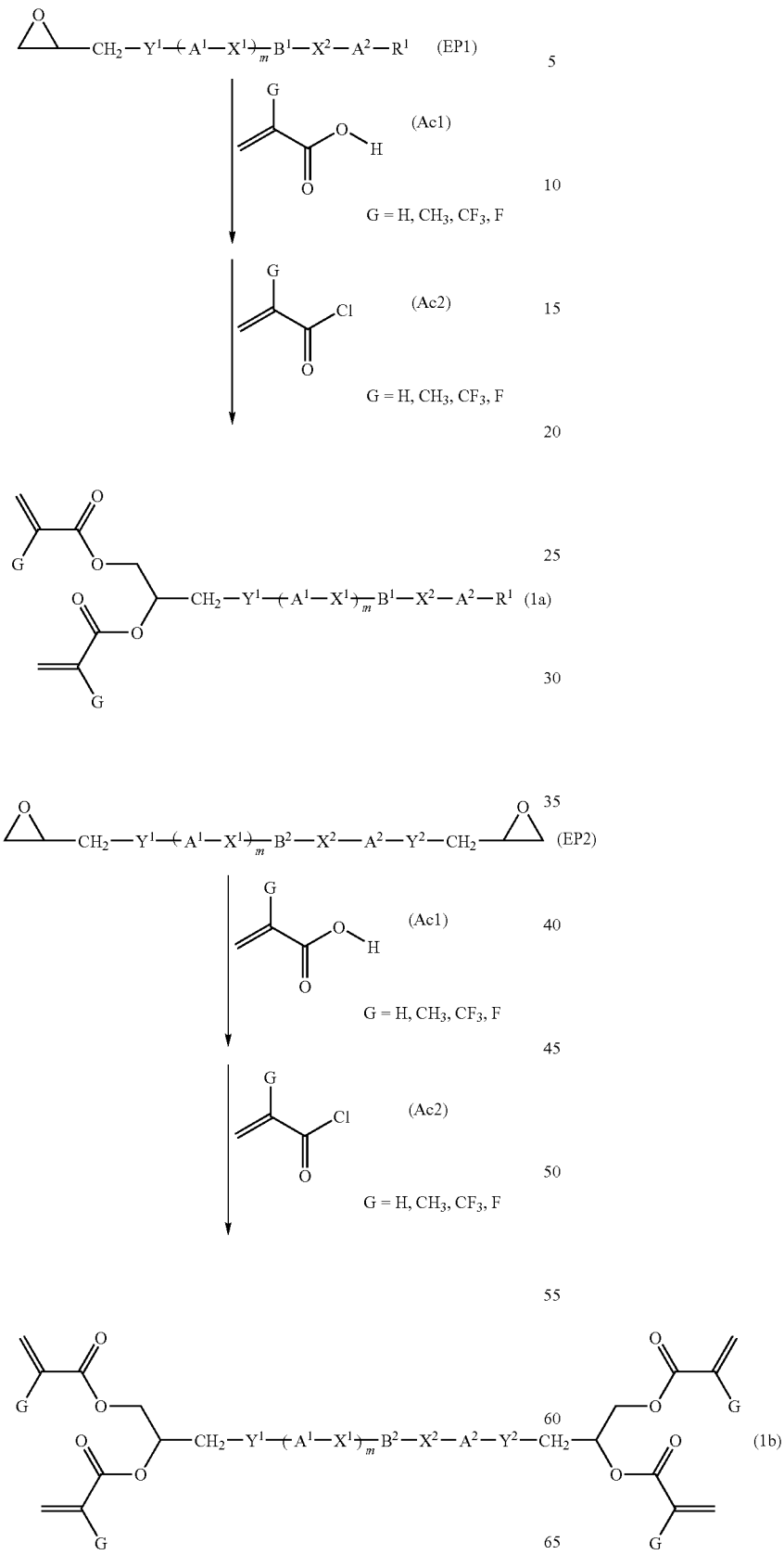

Examples of the compound synthesized by the aforementioned method include the following compounds Nos. 1 to 65.
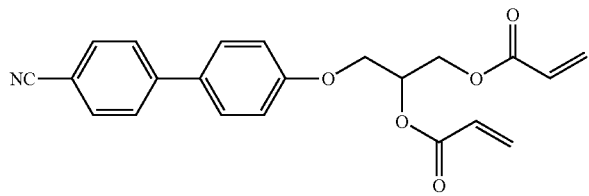
No.1
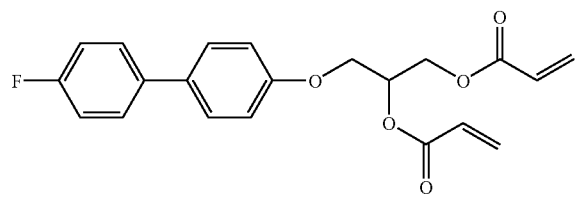
No.2
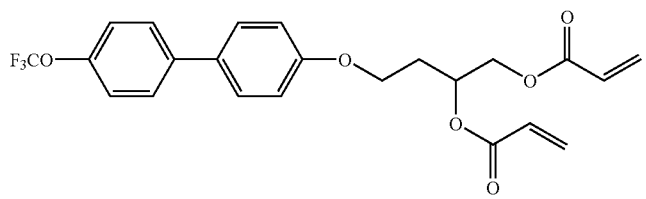
No.3
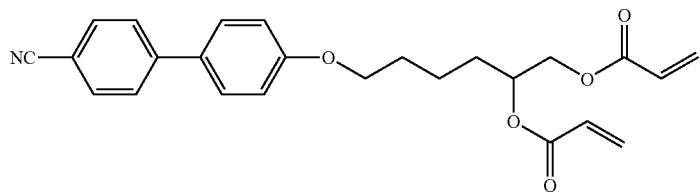
No.4
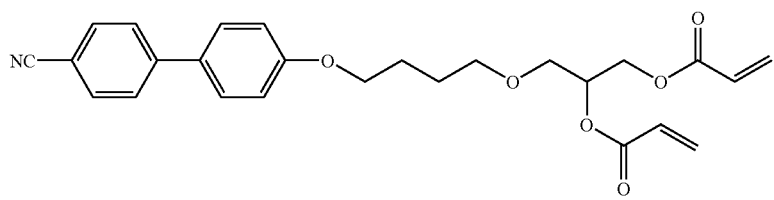
No.5
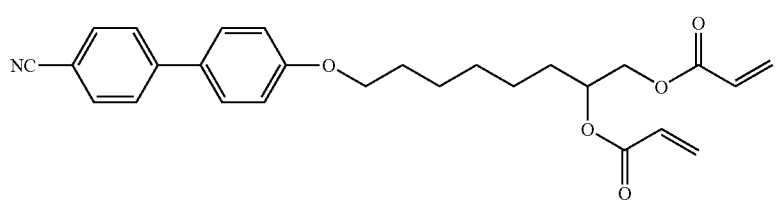
No.6
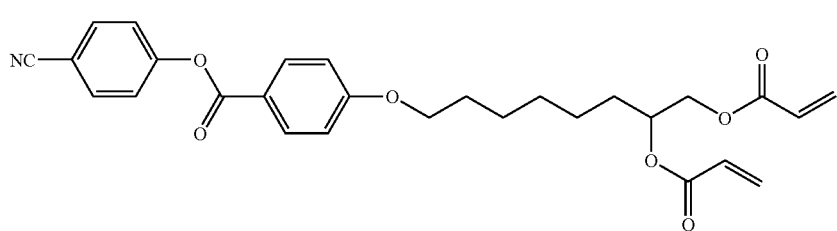
No.7

-continued
No.8
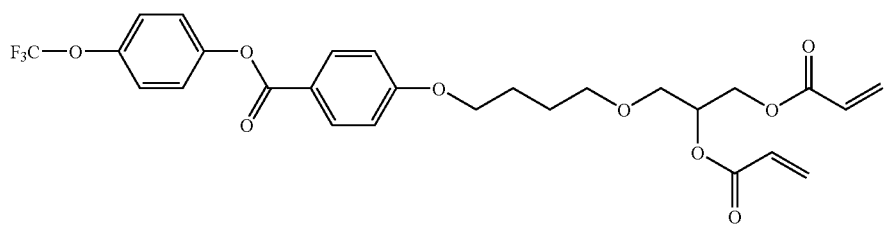
No.9
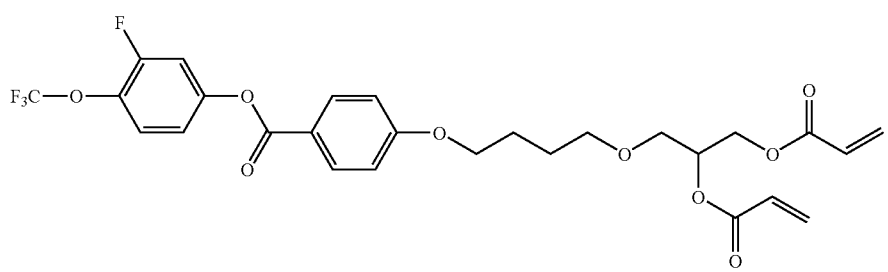
No.10
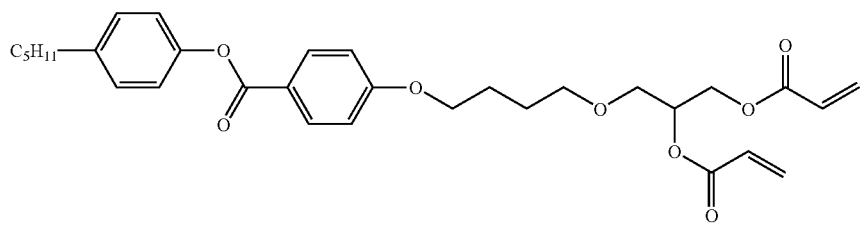
No.11
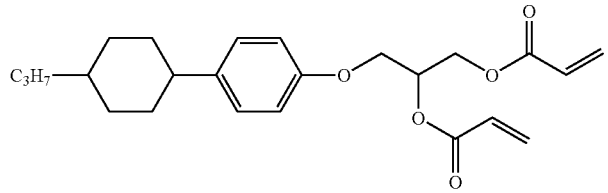
No.12
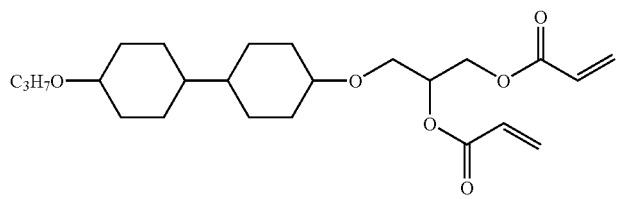
No.13
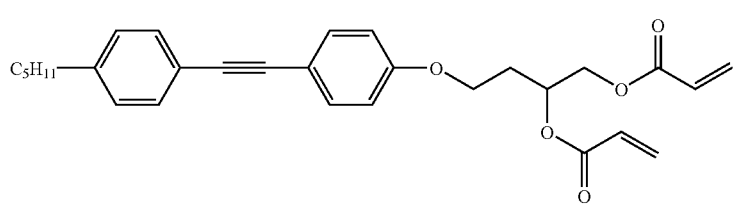
No.14
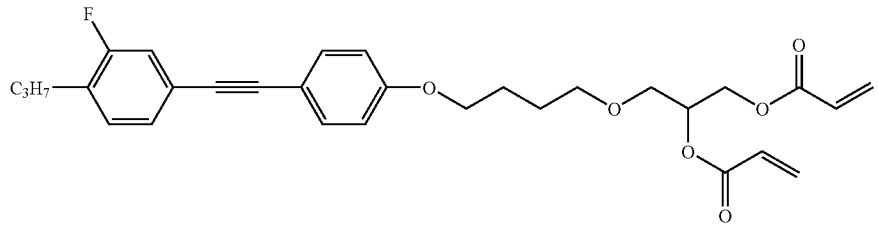

-continued
No.15
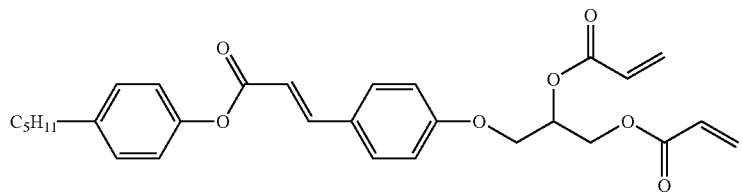
No.16
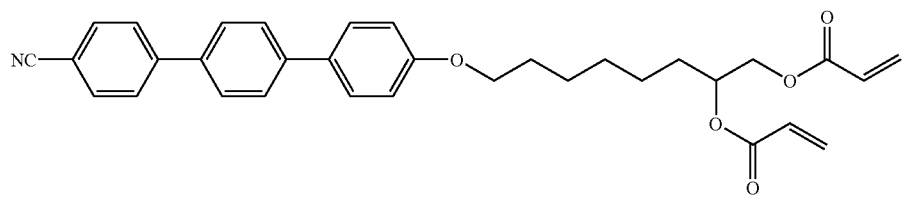
No.17
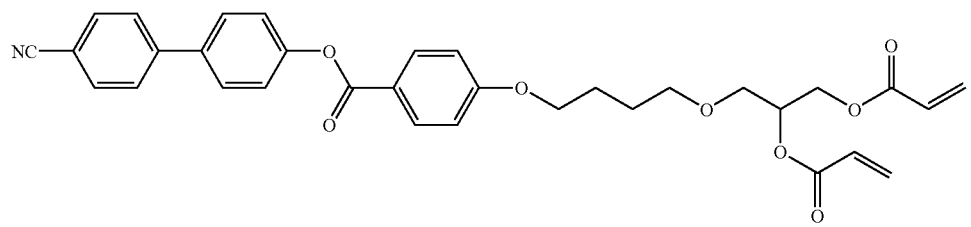
No.18
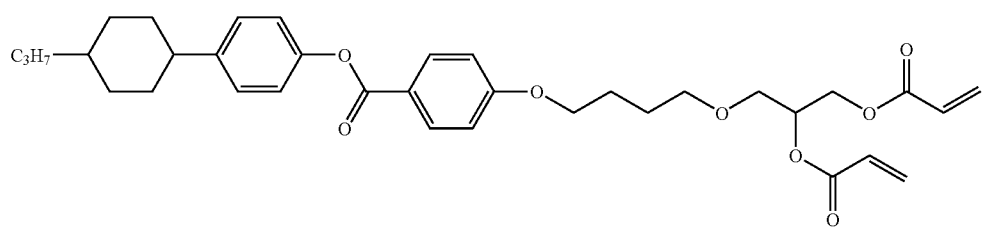
No.19
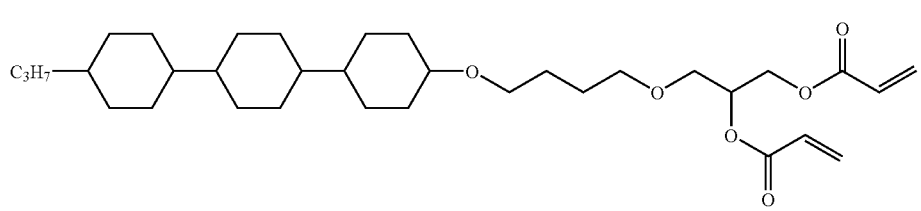
No.20
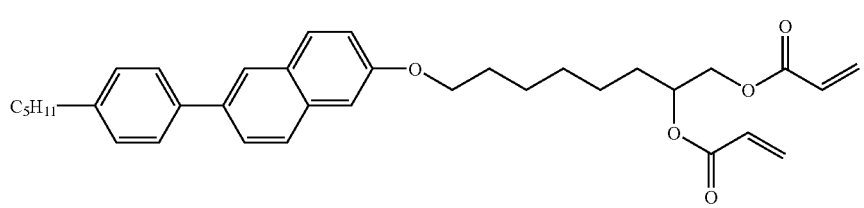
No.21
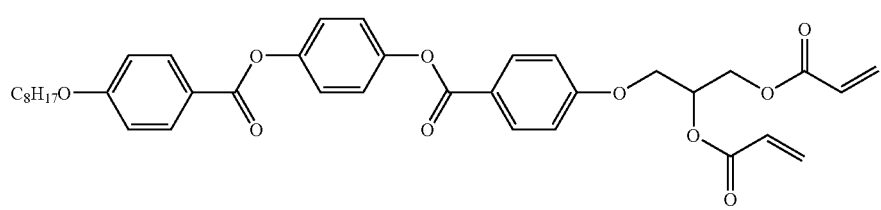

-continued
No.22
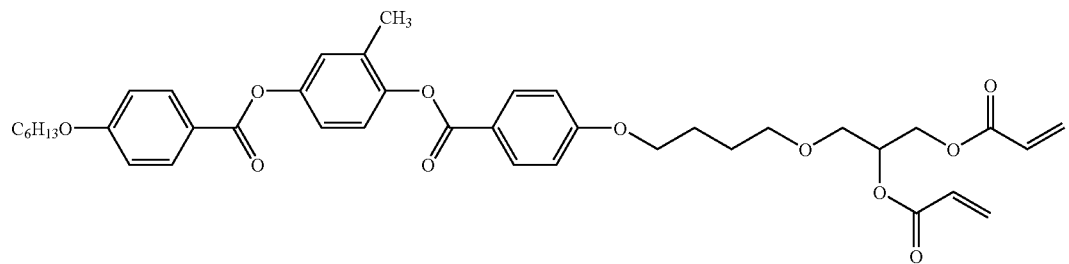
No.23
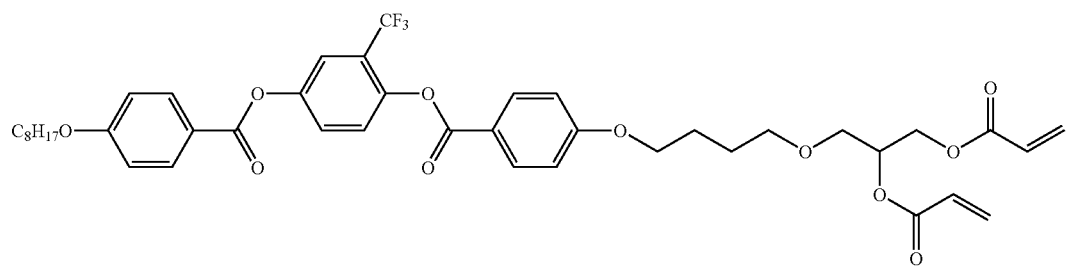
No.24
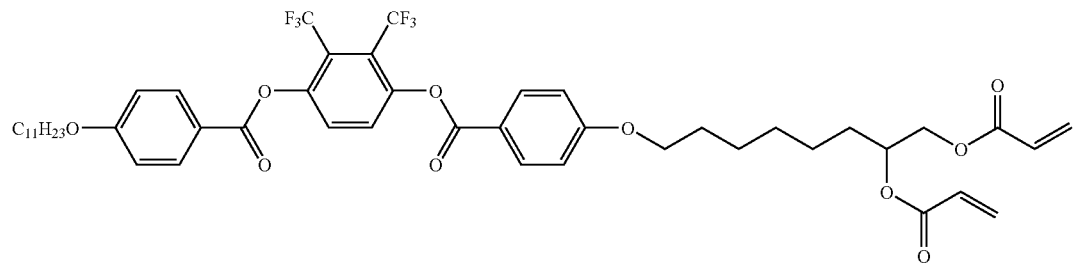
No.25
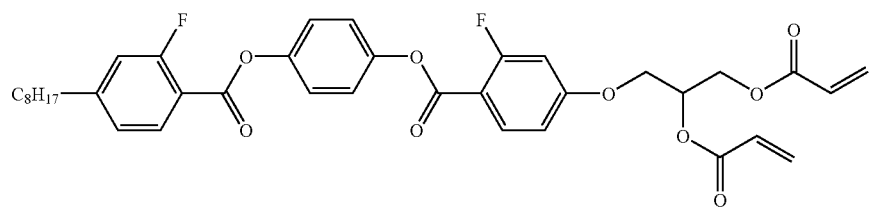
No.26
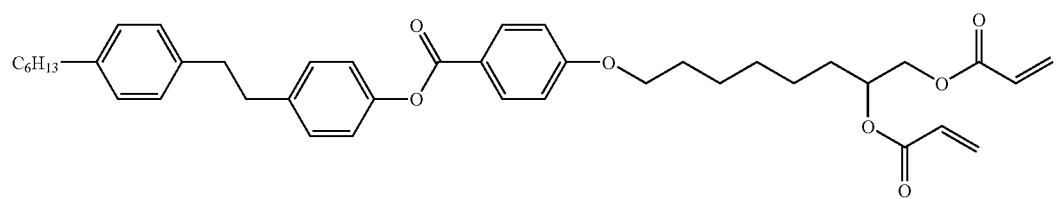
No.27
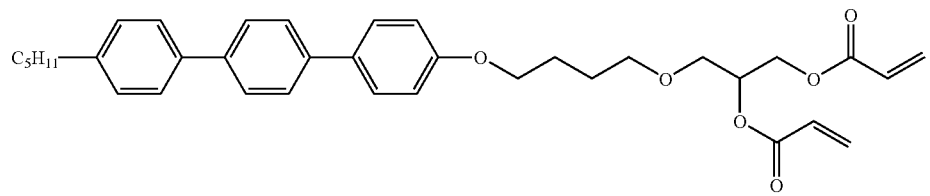

-continued
No.28
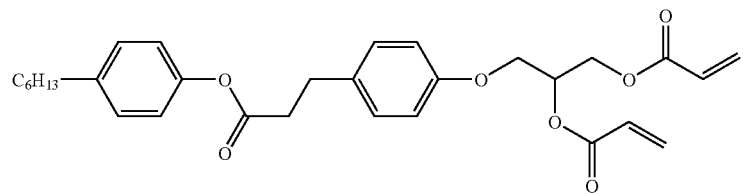
No.29
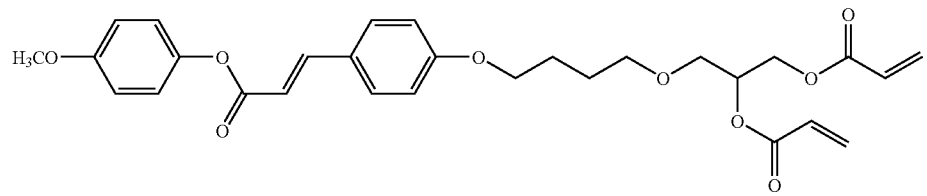
No.30
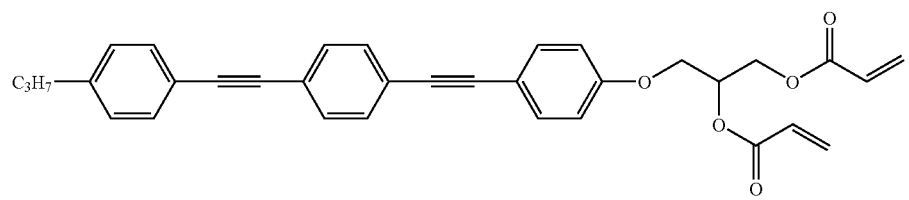
No.31
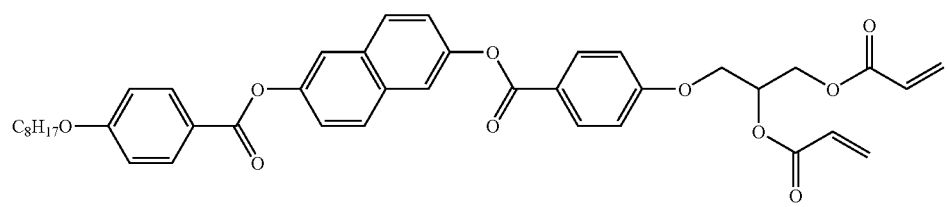
No.32
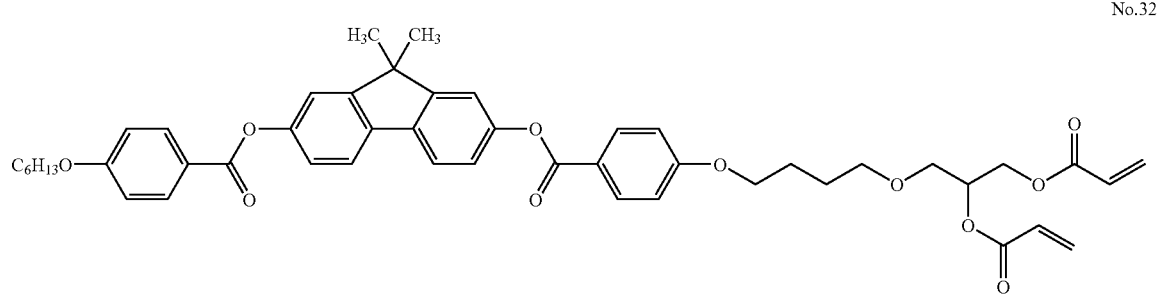
No.33
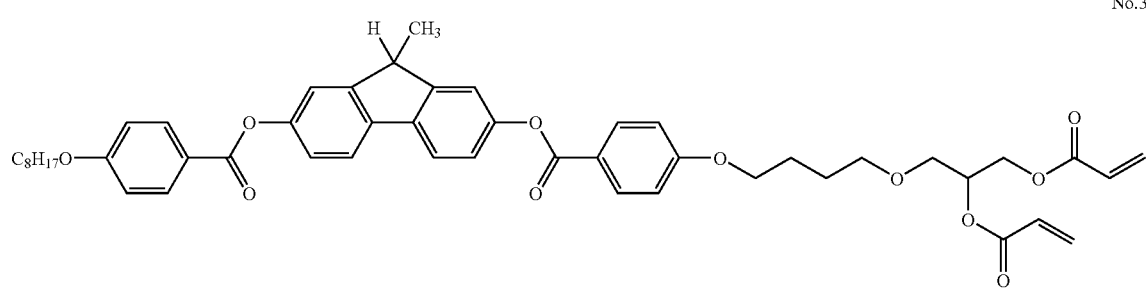

-continued
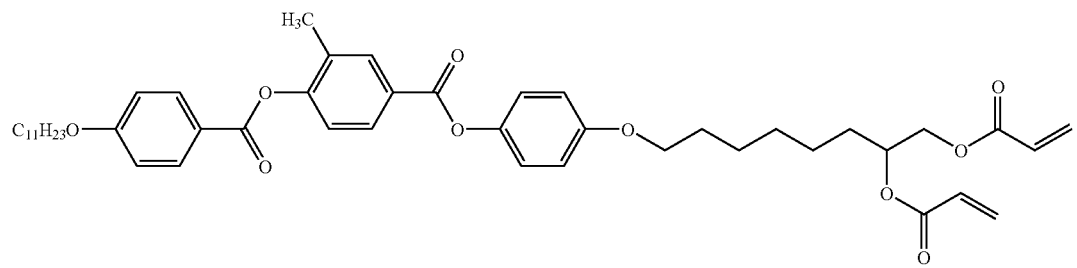
No.34
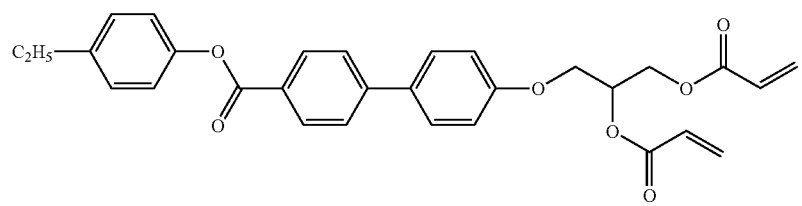
No.35
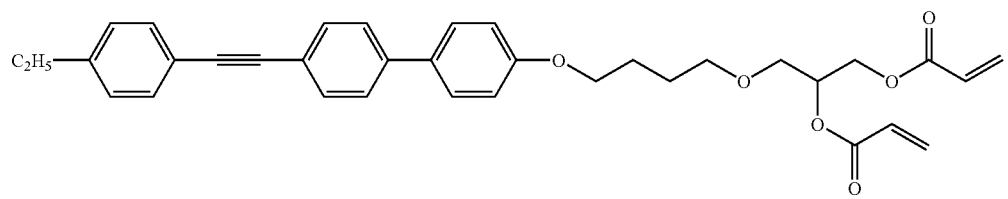
No.36
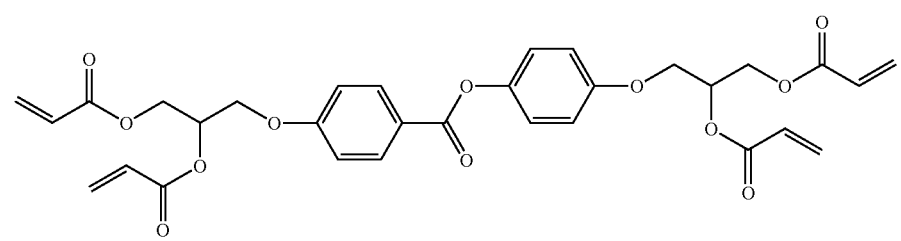
No.37
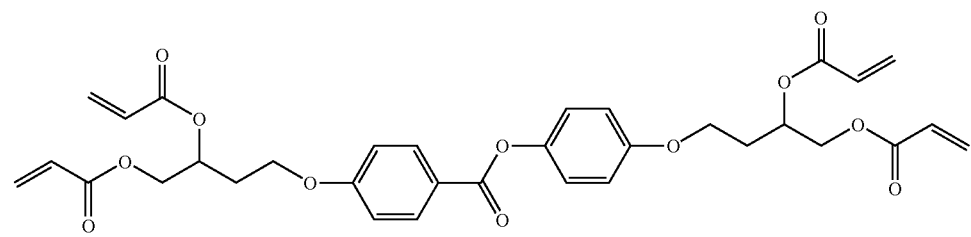
No.38
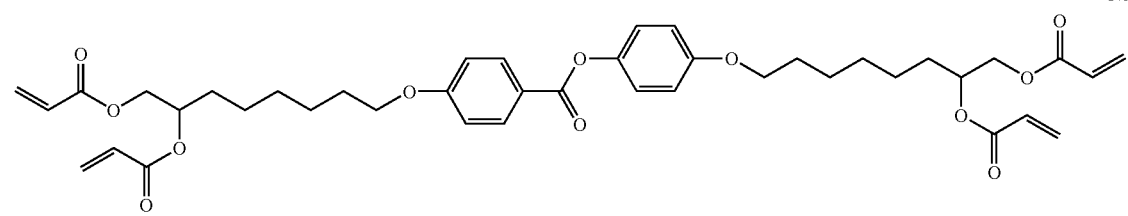
No.39

-continued
No.40
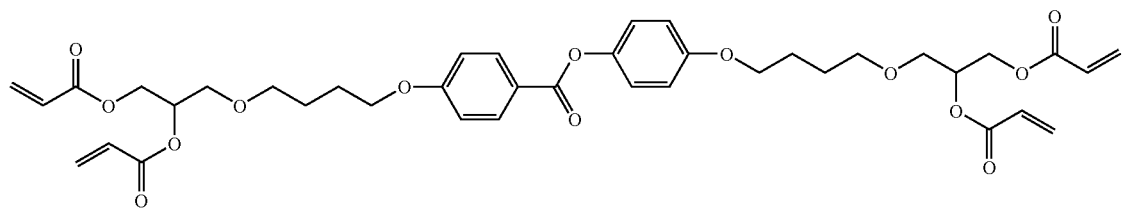
No.41
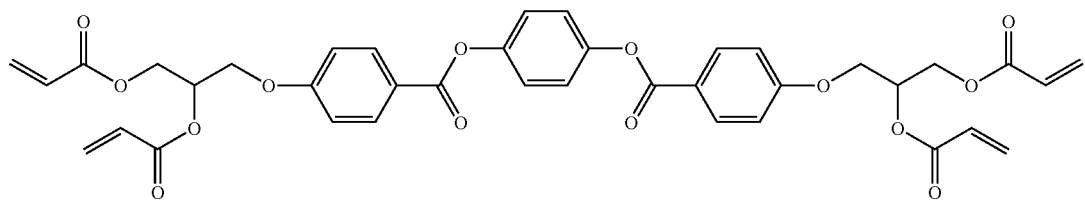
No.42
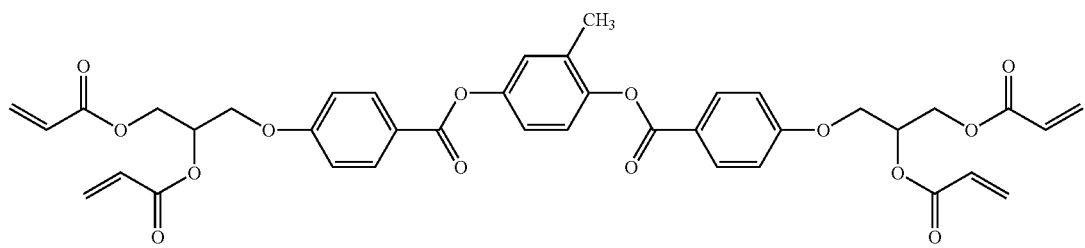
No.43
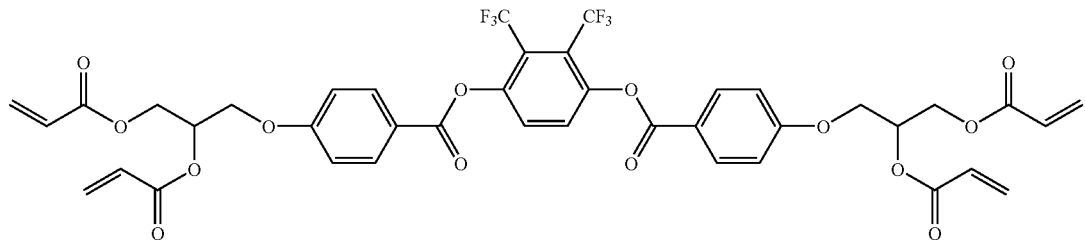
No.44
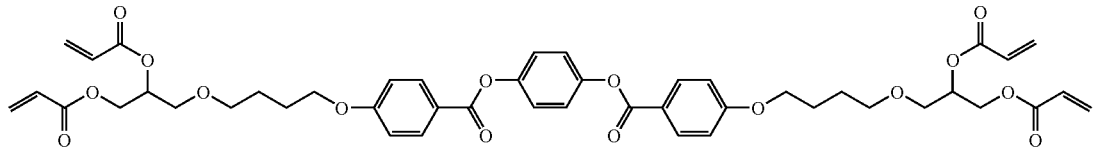
No.45
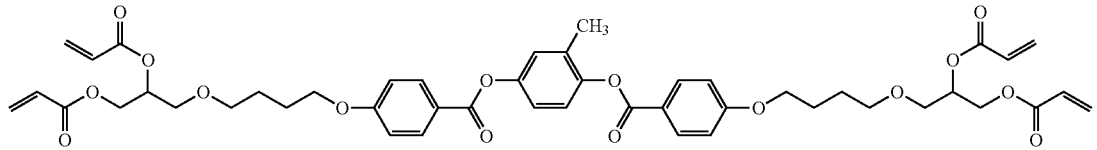
No.46
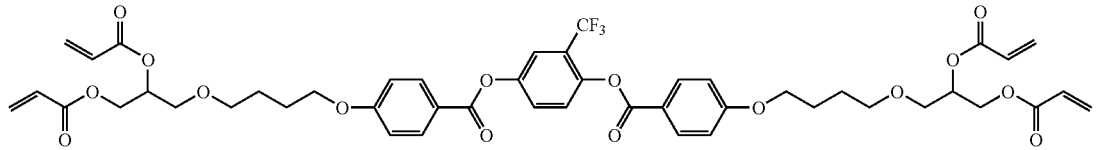
No.47
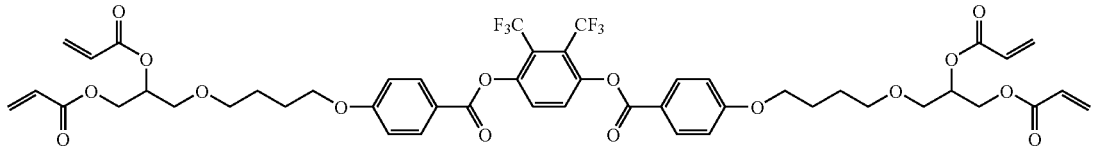

-continued
No.48
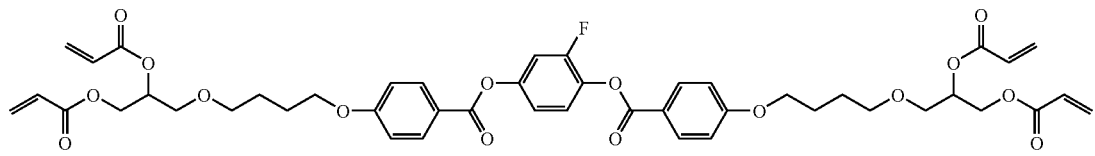
No.49
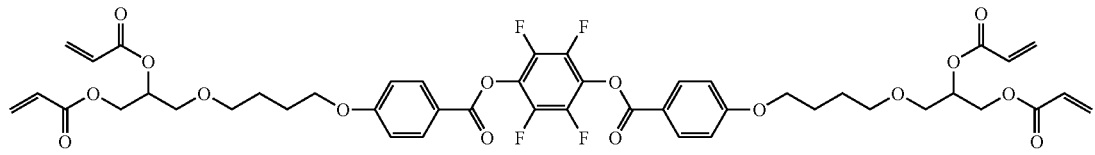
No.50
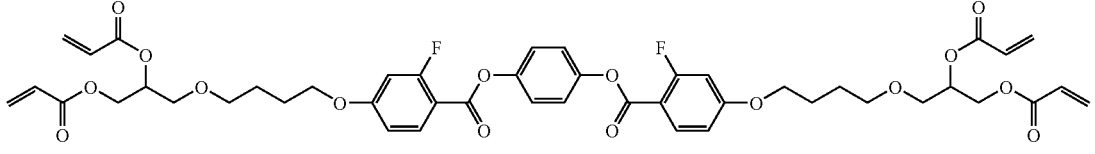
No.51
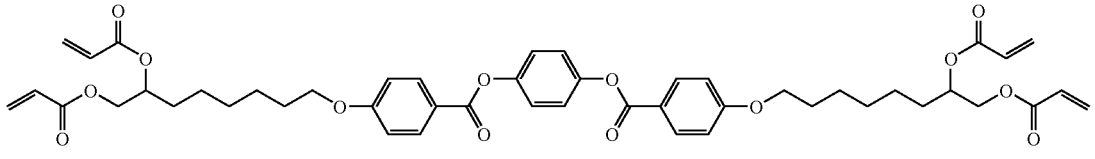
No.52
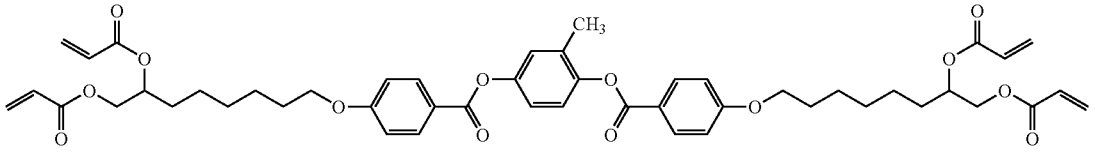
No.53
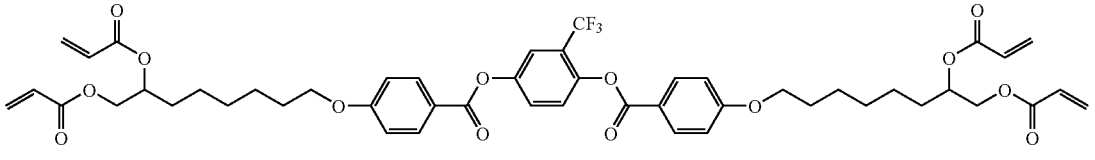
No.54
No.55
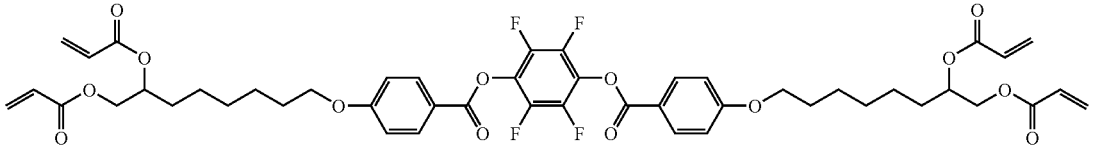
No. 56
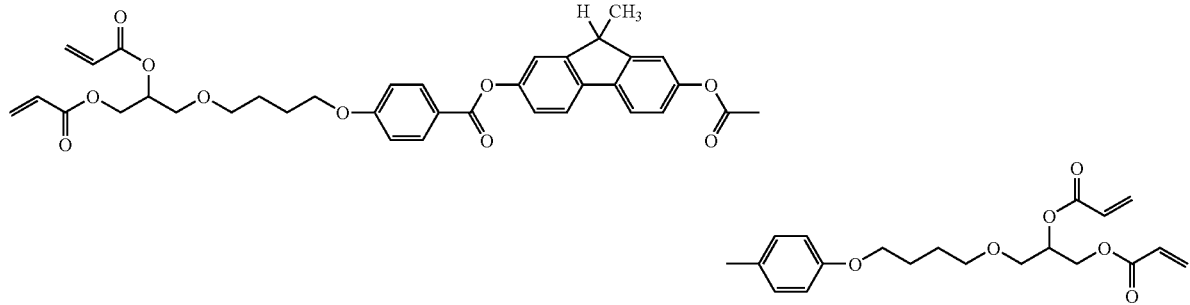

-continued
No. 57
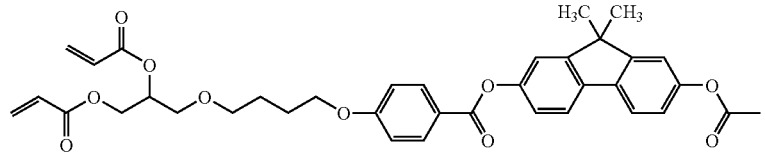
No. 58
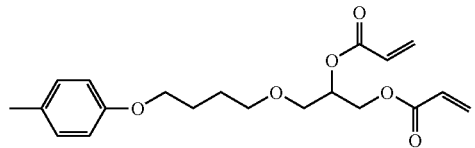
No. 59
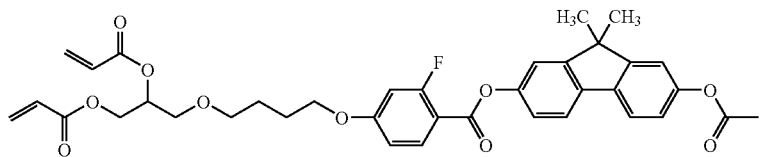
No.59
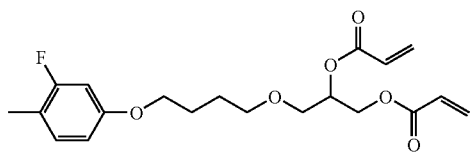
No.60
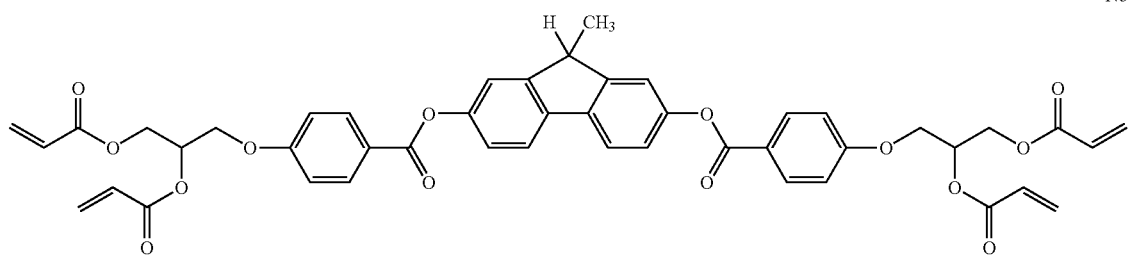
No.61
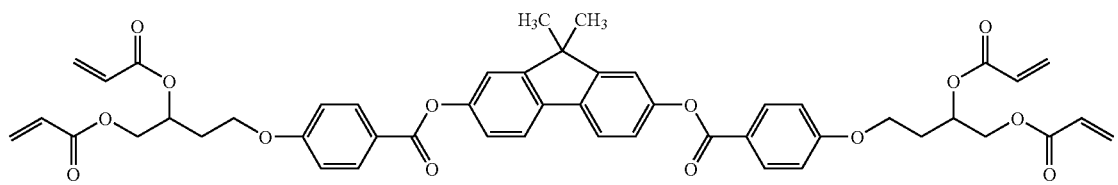
No.62
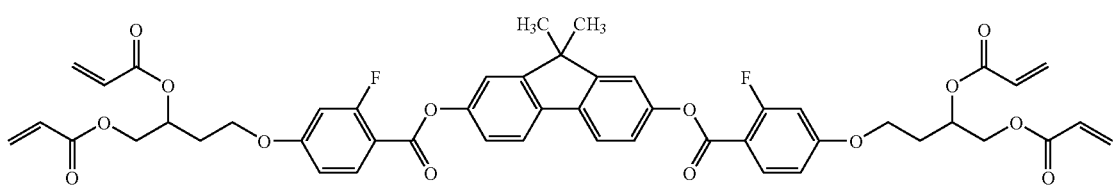
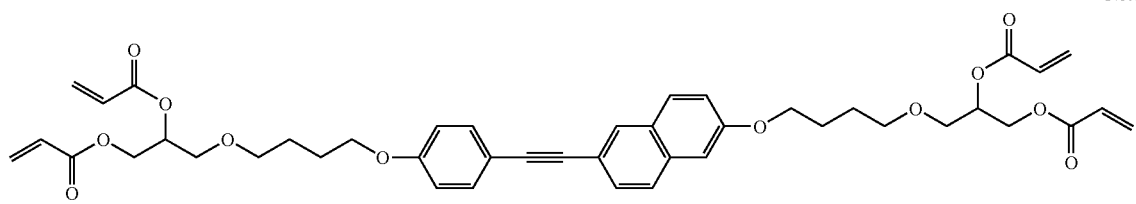

-continued

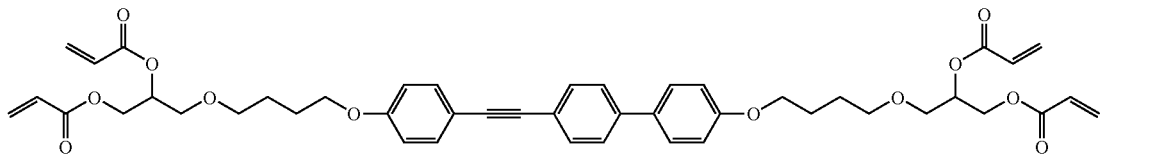
No.63

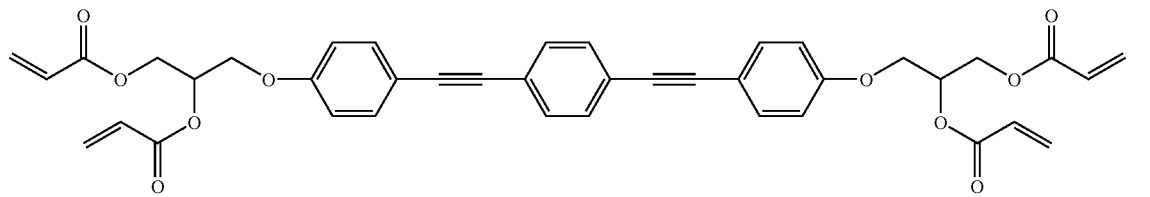
No.64

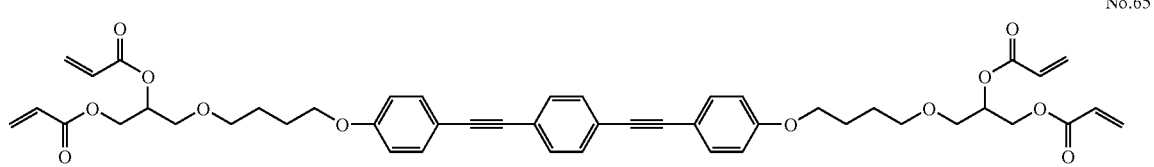
No.65

The composition of the invention will be described. The composition contains at least one of the compound (1a) or (1b) as the first component. The composition can be classified into the following compositions A, B and the like. The composition A contains two or more compounds selected from the group of the compound (1a) or (1b). The composition B contains at least one compound selected from the group of the compound (1a) or (1b) as the first component, and at least one compound selected from the group of the other polymerizable liquid crystal compounds as the second component.

The composition B preferably contains at least one compound selected from the group of the compound (1a) or (1b) as the first component, and at least one of the compounds represented by the formulae (M1), (M2) and (M3) as the second component. The second component is suitable for being polymerized with the compound (1a) or (1b). The compound (M1) is a bifunctional liquid crystal acrylate compound. The compound (M2) is a monofunctional liquid crystal acrylate compound. The compound (M3) is a bifunctional optically active liquid crystal acrylate compound.

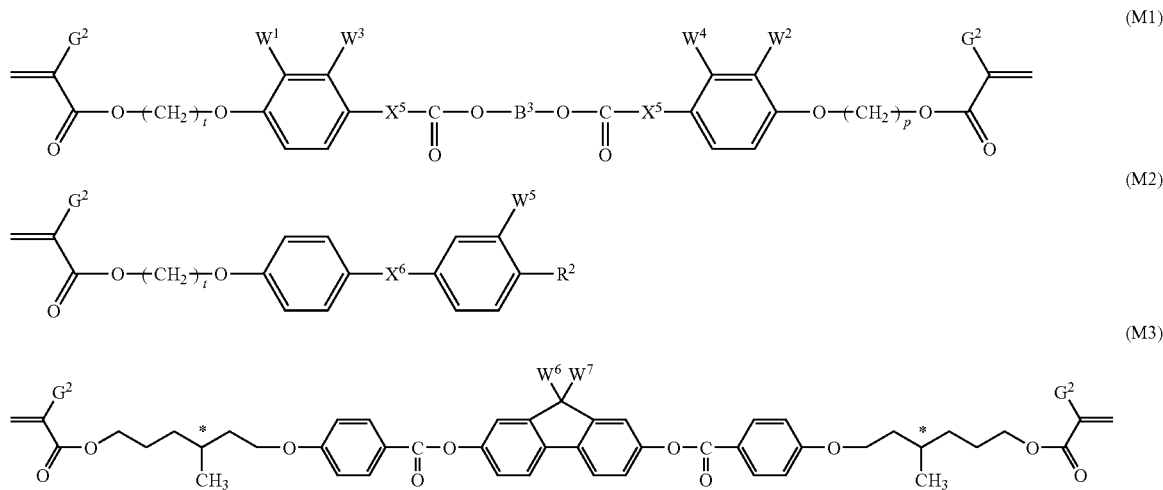

In the formulae (M1), (M2) and (M3), $B^3$ represents 1,4-phenylene, 2-fluoro-1,4-phenylene, 2-methyl-1,4-phenylene, 2-trifluoromethyl-1,4-phenylene, 2,3-ditrifluoromethyl-1,4-phenylene, naphthalene-2,6-diyl, 9-methylfluorene-2,7-diyl, 9-ethylfluorene-2,7-diyl or 9,9-dimethylfluorene-2,7-diyl; $R^2$ represents a fluorine atom, —$OCF_3$, —CN, an alkyl group having from 1 to 20 carbon atoms or an alkoxy group having from 1 to 20 carbon atoms; $X^5$ independently represents a single bond, —$(CH_2)_2$—, or —C≡C—; $X^6$ represents a single bond, —COO—, —OCO—, —CH═CH—COO—, —OOC—HC═CH— or —C≡C—; p and t each independently represents an integer of from 1 to 20; $G^2$ represents a hydrogen atom, a fluorine atom, a methyl group or a trifluoromethyl group; $W^1$, $W^2$, $W^3$, $W^4$ and $W^5$ each independently represents a hydrogen atom or a fluorine atom; and $W^6$ and $W^7$ each independently represents a hydrogen atom or a methyl group, provided that a carbon atoms attached with an asterisk is a asymmetric carbon atom, plural groups represented by $X^5$ may be the same groups or different groups, plural integers represented by t may be the same or different, and plural groups represented by $G^2$ may be the same groups or different groups.

Preferred examples of the compound (M1) usable in the composition include the following compounds (M1-1) to (M1-9).

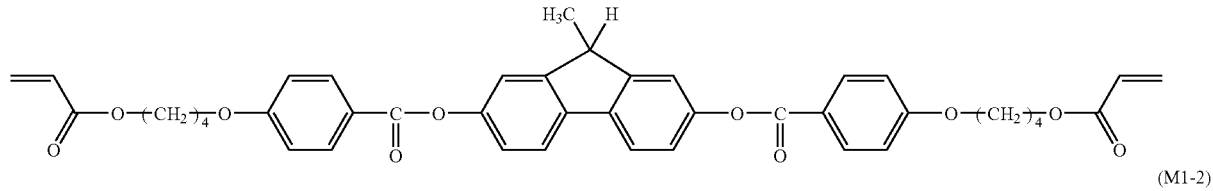
(M1-1)

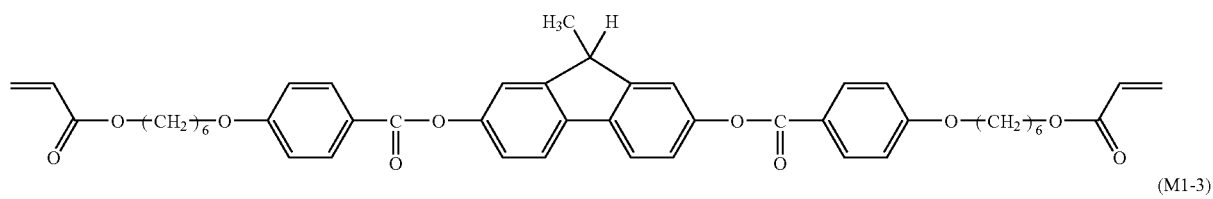
(M1-2)

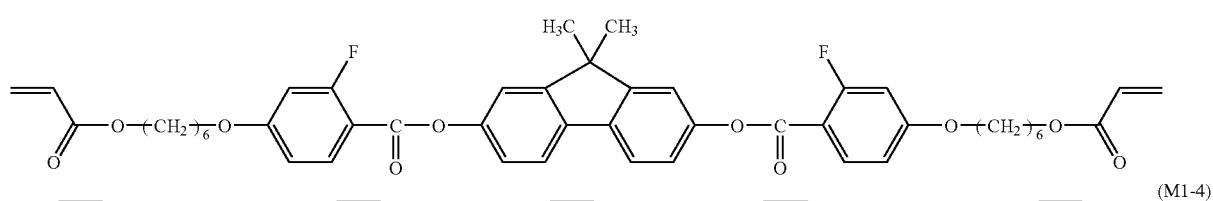
(M1-3)

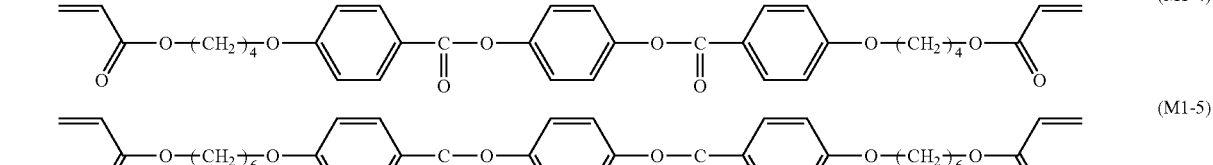
(M1-4)

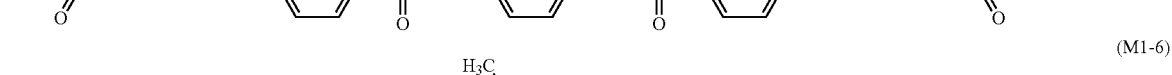
(M1-5)

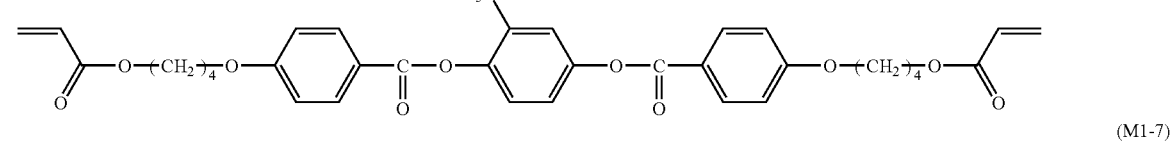
(M1-6)

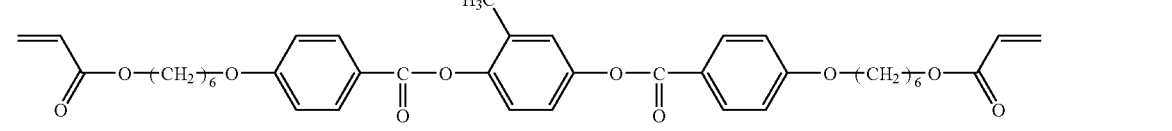
(M1-7)

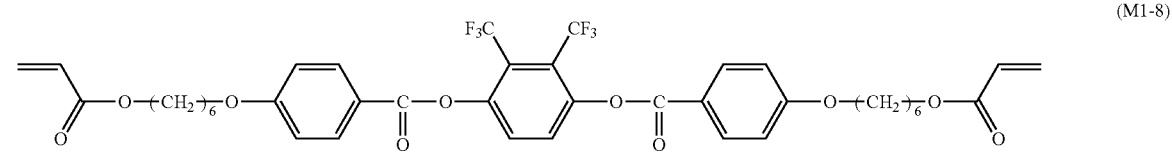
(M1-8)

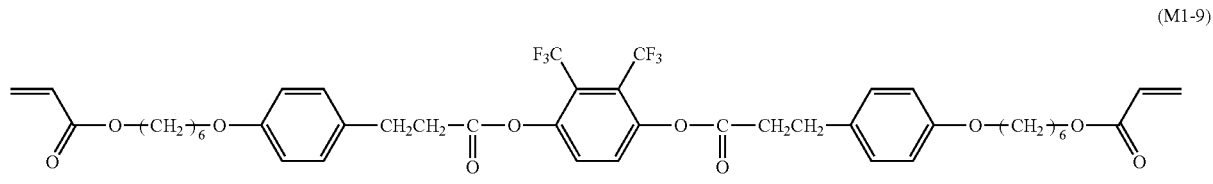
(M1-9)

The compounds (M1-1) to (M1-3) can be synthesized by the method disclosed in JP-A-2003-238491. The compounds (M1-5) to (M1-7) can be synthesized by the method disclosed in *Makromol. Chem.*, vol. 190, pp. 2255-2268 (1989). The compound (M1-8) can be synthesized by the method disclosed in JP-A-2004-231638.

Preferred examples of the compound (M2) usable in the composition include the following compounds (M2-1) to (M2-6).

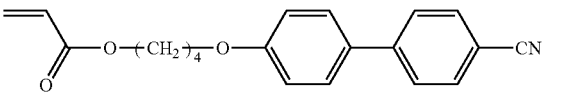
(M2-1)

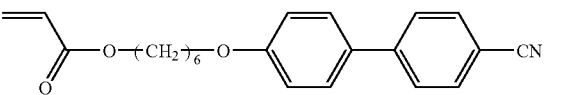
(M2-2)

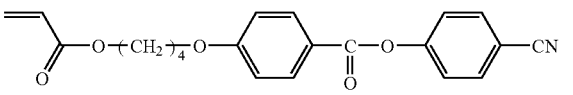
(M2-3)

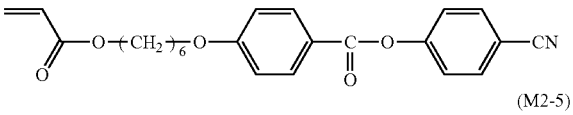
(M2-4)

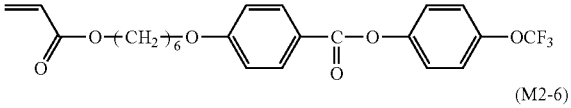
(M2-5)

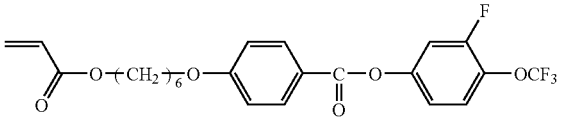
(M2-6)

The synthesis method of the compounds (M2-1) and (M2-2) is disclosed in *Macromolecules*, vol. 26, pp. 6132-6134 (1993).

Preferred examples of the compound (M3) usable in the composition include the following compounds (M3-1) and (M3-2).

The synthesis method of the compounds (M3-1) and (M3-2) is disclosed in JP-A-2005-97281.

In the case where the first component is at least one of the compounds represented by the formulae (3) to (6) and the second component is at least one of the compounds (M1), (M2) and (M3), preferred examples of the combination include the following compositions (C1), (C2) and (C3) summarized in Table 1 below. In the table, "Compounds (3) to (6)" mean the compounds represented by the formulae (3) to (6) respectively. The compounds (M1), (M2) and (M3) are available for adjusting the temperature range of a liquid crystal phase, the viscosity and the orientation of a liquid crystal phase of the composition, and the film forming property, the mechanical strength, the heat resistance and the solvent resistance of the polymer. The compositional ratio of the first and second components is preferably such a ratio that the content of the first component is from 20 to 80% by weight, and a content of the second component is from 20 to 80% by weight, with respect to a total amount of the first and second components being 100% by weight.

TABLE 1

| Preferred Compositions | | |
|---|---|---|
| Composition | First component | Second Component |
| Composition (C1) | Compound (6) | Compound (M1) |
| Composition (C2) | Compound (6) | Compound (M2) |
| Composition (C3) | Compound (6) | Compound (M3) |

The compositions (C1), (C2) and (C3) have the following characteristics. (1) By adding a polymerization initiator to the composition, the composition can undergo prompt polymerization by irradiation of an ultraviolet ray, an electron beam or the like. (2) The composition is excellent in orientation property. (3) The composition is excellent in compatibility with another polymerizable liquid crystal compound.

The composition, such as the compositions A and B, may contain an additive depending on necessity. Examples of an additive for adjusting the characteristics of the polymer include a non-liquid crystal polymerizable compound, a surfactant, an antioxidant, an ultraviolet ray absorbent and fine particles. Examples of an additive for polymerizing a monomer include a polymerization initiator, a sensitizer and a chain transfer agent. An organic solvent is preferably used for diluting the composition. The amount of the additive is preferably such a small amount that can attain the intended function thereof. The atoms constituting the components of the com-

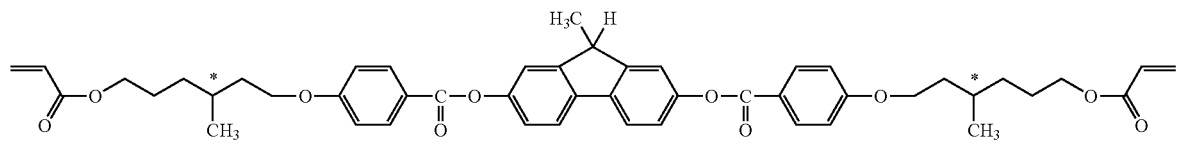
(M3-1)

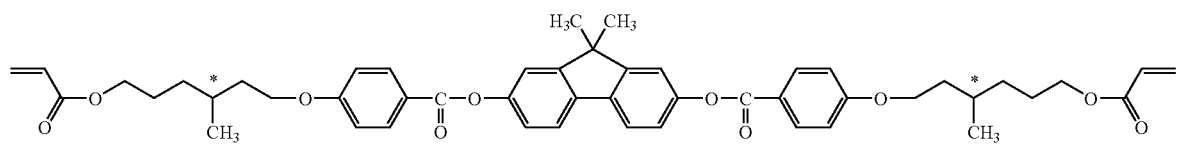
(M3-2)

position may preferably contain an isotope thereof in an amount larger than the naturally occurring amount since the similar characteristics are obtained thereby.

A non-liquid crystal polymerizable compound may be added to the composition for adjusting the film forming property and the mechanical strength of the polymer. Preferred examples of the non-liquid crystal polymerizable compound include a (meth)acrylate compound, a vinyl compound, a styrene compound, a vinyl ether compound and a polyfunctional acrylate.

Preferred specific examples of the non-liquid crystal polymerizable compound include methyl(meth)acrylate, ethyl (meth)acrylate, butyl(meth)acrylate, 2-ethylhexyl(meth)acrylate, phenyl(meth)acrylate, vinyl chloride, vinyl fluoride, vinyl acetate, vinyl pivalate, vinyl 2,2-dimethylbutanoate, vinyl 2,2-dimethylpentanoate, vinyl 2-methyl-2-butanoate, vinyl propionate, vinyl stearate, vinyl 2-ethyl-2-methylbutanoate, N-vinylacetamide, vinyl p-t-butylbenzoate, vinyl N,N-dimethylaminobenzoate, vinyl benzoate, styrene, o-, m- or p-chloromethylstyrene, α-methylstyrene, tetrafluoroethylene and hexafluoropropene. The non-liquid crystal polymerizable compound is suitable for adjusting the viscosity of the composition owing to the low molecular weight thereof.

Preferred examples of the polyfunctional acrylate include 1,4-butanediol diacrylate, 1,6-hexanediol diacrylate, 1,9-nonanediol diacrylate, neopentyl glycol diacrylate, triethylene glycol diacrylate, dipropylene glycol diacrylate, tripropylene glycol diacrylate, tetraethylene glycol diacrylate, trimethylolpropane triacrylate, trimehtylol ethylene oxide adduct triacrylate, pentaerythritol triacrylate, trisacryloxyethyl phosphate, bisphenol A ethylene oxide adduct diacrylate, bisphenol A diglycidyl diacrylate (Viscoat 700, a trade name, produced by Osaka Organic Chemical Industry, Ltd.) and polyethylene glycol diacrylate. The polyfunctional acrylate can be used for improving the film forming capability of the polymer.

The surfactant has such functions as facilitating the composition being coated on a supporting substrate, and controlling orientation of the liquid crystal phase. Examples of the surfactant include imidazoline, a quaternary ammonium salt, alkylamine oxide, a polyamine derivative, a polyoxyethylene-polyoxypropylene condensate, polyethylene glycol and an ester thereof, sodium lauryl sulfate, ammonium lauryl sulfate, lauryl amine sulfate, an alkyl-substituted aromatic sulfonate salt, an alkyl phosphonate, an aliphatic or aromatic sulfonic acid formalin condensate, laurylamide propyl betaine, lauryl amino acetate betaine, a polyethylene glycol aliphatic acid ester, polyoxyethylene alkylamine, a perfluoroalkyl sulfonate salt, a perfluoroalkyl carboxylate salt, a perfluoroalkyl ethylene oxide adduct, a perfluoroalkyl trimethylammonium salt, an oligomer containing a perfluoroalkyl group and a hydrophilic group, an oligomer containing a perfluoroalkyl group and an oleophilic group, and urethane having a perfluoroalkyl group. The preferred amount of the surfactant varies depending on the kind of the surfactant and the compositional ratio of the composition, and is generally from 100 ppm to 5% by weight, and more preferably from 0.1 to 1% by weight, based on the total weight of the composition.

Preferred examples of the antioxidant include hydroquinone, 2,6-di-t-butyl-p-cresol, 2,6-di-t-butylphenol, triphenyl phosphite and trialkyl phosphite. Preferred examples of the commercially available product include Irganox 245 and Irganox 1035, produced by Ciba Specialty Chemicals, Inc.

Preferred examples of the ultraviolet ray absorbent include Tinuvin PS, Tinuvin 213, Tinuvin 109, Tinuvin 328, Tinuvin 384-2 and Tinuvin 327, produced by Ciba Specialty Chemicals, Inc. Fine particles may be added for adjusting the optical anisotropy and for improving the strength of the polymer. Preferred examples of the material of the fine particles include an inorganic material, an organic material and a metal. Preferred examples of the inorganic material include ceramics, gold fluoride mica, tetrasilicon fluoride mica, taeniolite, fluorine verculite, fluorine hectite, hectorite, saponite, stevensite, montmorillonite, beidellite, kaolinite, frypontite, ZnO, $TiO_2$, $CeO_2$, $Al_2O_3$, $Fe_2O_3$, $ZrO_2$, $MgF_2$, $SiO_2$, $SrCO_3$, $Ba(OH)_2$, $Ca(OH)_2$, $Ga(OH)_3$, $Al(OH)_3$, $Mg(OH)_2$ and $Zr(OH)_4$. Such fine particles as acicular crystals of calcium carbonate have optical anisotropy, by which the optical anisotropy of the polymer can be adjusted.

Preferred examples of the organic material include carbon nanotubes, fullerene, dendrimer, polyvinyl alcohol, polymethacrylate and polyimide. The fine particles preferably have a particle diameter of from 0.001 to 0.1 μm, and more preferably from 0.001 to 0.05 μm. A smaller particle diameter is preferred for preventing an aggregating phenomenon, while depending on the material. The distribution of the particle diameter is preferably sharp. The addition amount of the fine particles is preferably from 0.1 to 30% by weight based on the total weight of the composition, and is preferably as small as possible as long as the intended effect of the addition is obtained.

The composition is subjected to polymerization reaction by using an ordinary photoradical polymerization initiator. Examples of the photoradical polymerization initiator include Darocure 1173 (2-hydroxy-2-methyl-1-phenylpropan-1-one), Irgacure 184 (1-hydroxycyclohexyl phenyl ketone), Irgacure 651 (2,2-dimethoxy-1,2-diphenylethan-1-one), Irgacure 500, Irgacure 2959, Irgacure 907, Irgacure 369, Irgacure 1300, Irgacure 819, Irgacure 1700, Irgacure 1800, Irgacure 1850, Darocure 4265 and Irgacure 784, all produced by Ciba Specialty Chemicals, Inc.

Other examples of the photoradical polymerization initiator include p-methoxyphenyl-2,4-(bis(trichloromethyl)triazine, 2-(p-butoxystyryl)-5-trichloromethyl-1,3,4-oxadiazole, 9-phenylacridine, 9,10-benzphenazine, a mixture of benzophenoen and Michler's ketone, a mixture of hexaarylbiimidazole and mercaptobenzimidazole, 1-(4-isopropylphenyl)-2-hydroxy-2-methylpropan-1-one, benzylmethylketal, 2-methyl-1-(4-(methylthio)phenyl)-2-morpholinopropan-1-one, a mixture of 2,4-diethylxanthone and methyl p-dimethylaminobenzoate, and a mixture of benzophenone and methyltriethanolamine.

Examples of the solvent include benzene, toluene, xylene, mesitylene, n-butylbenzene, diethylbenzene, tetralin, methoxybenzene, 1,2-dimethoxybenzene, ethylene glycol dimethyl ether, diethylene glycol dimethyl ether, acetone, methyl ethyl ketone, methyl isobutyl ketone, cyclopentanone, cyclohexanone, ethyl acetate, methyl lactate, ethyl lactate, ethylene glycol monomethyl ether acetate, propylene glycol monomethyl ether acetate, propylene glycol monoethyl ether acetate, γ-butyrolactone, 2-pyrrolidone, N-methyl-2-pyrrolidone, dimethylformamide, chloroform, dichloromethane, carbon tetrachloride, dichloroethane, tetrachloroethylene, trichloroethylene, chlorobenzene, t-butyl alcohol, diacetone alcohol, glycerin, ethylene glycol, triethylene glycol, hexylene glycol, ethylene glycol monomethyl ether, ethyl cellosolve and butyl cellosolve. The solvent may be either a single compound or a mixture.

The polymer will be described. The compounds (1a) and (1b) have a polymerizable group. The polymer is obtained by polymerizing a composition containing the compound. The resulting polymer has optical anisotropy. The polymer has large surface hardness and is excellent in heat resistance. Examples of the polymerization reaction include radical polymerization, anionic polymerization, cationic polymerization, coordination polymerization and living polymerization. In consideration of the nature of the polymerizable group, radical polymerization is preferably employed. In order to obtain a polymer excellent in orientation, radical polymerization with radiation of light is more preferably employed because a composition in a liquid crystal state can be easily polymerized thereby.

Preferred examples of the light include an ultraviolet ray, a visible ray and an infrared ray. The wavelength of light is properly selected depending on the absorption wavelength of the photoradical polymerization initiator used. The wavelength of light is preferably in a range of from 150 to 500 nm, more preferably from 250 to 450 nm, and most preferably from 300 to 400 nm. Examples of the light source include a low pressure mercury lamp (such as a sterilizing lamp, a fluorescent chemical lamp and a black lamp), a high pressure mercury lamp (such as a high pressure mercury lamp and a metal halide lamp) and a short arc discharge lamp (such as a superhigh pressure mercury lamp, a xenon lamp and a mercury xenon lamp). Preferred examples of the light source include a superhigh pressure mercury lamp. The composition may be irradiated with light emitted from the light source as it is, and may be irradiated with light having a particular wavelength (or a particular wavelength range) selected with a filter. The irradiation energy density is preferably from 2 to 5,000 mJ/cm$^2$, more preferably from 10 to 3,000 mJ/cm$^2$, and particularly preferably from 100 to 2,000 mJ/cm$^2$. The illuminance is preferably from 0.1 to 5,000 mW/cm$^2$, and more preferably from 1 to 2,000 mW/cm$^2$. The temperature, upon which the composition is irradiated with light, is determined in such a manner that the composition has a liquid crystal phase. The irradiation temperature is preferably 100° C. or less because thermal polymerization is hard to occur at a temperature of 100° C. or less, and thereby favorable orientation can be obtained.

Examples of the shape of the polymer include a film and a plate. The polymer may be molded. In order to obtain the polymer in a film form, a support substrate is generally used. The composition is coated on a support substrate, and a coated film (paint film) of the composition having a liquid crystal phase, such as nematic orientation formed in a liquid crystal state, is polymerized to obtain a film having the fixed molecular orientation. The preferred thickness of the polymer in a film form varies depending on the value of the optical anisotropy and the purpose of the polymer. Therefore, the range of the optical anisotropy cannot be strictly determined but is preferably from 0.05 to 50 μm, more preferably from 0.1 to 20 μm, and particularly preferably from 0.5 to 10 μm. The haze value of the polymer is generally 1.5% or less, and preferably 1.0% or less. The transmittance of the polymer is generally 80% or more, and preferably 85% or more, in the visible range. The range of a haze value of 1.5% or less is a preferred condition for avoiding problem in polarizing capability. The range of a transmittance of 80% or more is a preferred condition for maintaining brightness upon applying the thin film having optical anisotropy to a liquid crystal display device. Therefore, the polymer is suitable as a thin film having optical anisotropy used in a liquid crystal display device.

Examples of the supporting substrate include triacetyl cellulose, polyvinyl alcohol, polyimide, polyester, polyarylate, polyetherimide, polyethylene terephthalate and polyethylene naphthalate. Examples of the commercially available product thereof include Arton, produced by JSR Corp. Zeonex and Zeonor, produced by Zeon Corp., and Apel, produced by Mitsui Chemicals, Inc. The supporting substrate may be a uniaxially oriented film or a biaxially oriented film. Preferred examples of the supporting substrate include a triacetyl cellulose (TAC) film. The film may be used without subjecting to a pretreatment. The film may be subjected to a surface treatment, such as a saponification treatment, a corona discharge treatment and an UV-ozone treatment, depending on necessity. Other examples of the supporting substrate include a metallic supporting substrate, such as aluminum, iron and copper, and a glass supporting substrate, such as alkali glass, borosilicate glass and flint glass.

The coated film on the supporting substrate is prepared by coating the composition as it is. The coated film may also be prepared by coating a solution obtained by diluting the composition with a suitable solvent, and then removing the solvent. Examples of the coating method include spin coating, roll coating, curtain coating, flow coating, printing, microgravure coating, gravure coating, wire bar coating, dip coating, spray coating and meniscus coating.

The factors determining the orientation of the liquid crystal composition include (1) the chemical structure of the polymerizable compound, (2) the kind of the supporting substrate and (3) the orientation treatment. The factor (1) depends on the side chain, ring, bonding group and polymerizable group of the polymerizable compound. The factor (2) depends on the material of the supporting substrate, such as a polymer, glass (such as alkali glass, borosilicate glass and flint glass) and a metal (such as aluminum, iron and copper). The factor (3) includes such methods as rubbing treatment in one direction with rayon cloth, oblique vapor deposition of silicon oxide, stretching, orientation with a polarized ultraviolet ray, rubbing-free orientation using an ion beam, provision of slit grooves on the surface, and etching treatment in a slit form. In the rubbing treatment, the supporting substrate may be directly rubbed. It is possible that the supporting substrate is coated with a thin film of polyimide or polyvinyl alcohol, and the thin film is rubbed. There has been known a peculiar thin film that provides good orientation without rubbing.

The orientation of a liquid crystal compound is classified into homogeneous, homeotropic, hybrid, tilted and twisted. In the homogeneous orientation, the orientation vector is in parallel to the substrate and is in only one direction. In the homeotropic orientation, the orientation vector is perpendicular to the substrate. In the hybrid orientation, the orientation vector turns up from parallelism to perpendicular with leaving from the substrate. In the tilted orientation, the orientation vector is tilted with respect to the substrate at a certain tilt angle. These orientation modes are observed in a composition having a nematic phase. The twisted orientation is observed in a composition having a chiral nematic phase or a cholesteric phase. In the twisted orientation, the orientation vector is in parallel to the substrate and is gradually twisted with leaving from the substrate. The twist occurs by an action of an optically active group.

The purpose of the polymer will be described. The polymer can be used as a molded article having optical anisotropy. A device containing the polymer includes such an optical film as a retardation film (a ½ wavelength film and a ¼ wavelength film), an antireflection film, a selective reflection film and a viewing angle compensation film. The polymer having homogeneous, hybrid or homeotropic orientation can be utilized as a retardation film, a polarizing device, a liquid crystal orientation film, an antireflection film, a selective reflection film and a viewing angle compensation film. The polymer having twisted orientation can be utilized as a retardation film, a polarizing device, a selective reflection film and a viewing angle compensation film. The polymer may be used as a retardation film and a viewing angle compensation film of a liquid crystal display for the purpose of optical compensation. The polymer may also be utilized as a highly thermal conductive epoxy resin, an adhesive, a synthetic polymer having mechanical anisotropy, cosmetics, an ornament, a non-linear optical material, an information recording material, and the like.

The retardation film has a function of converting the state of polarization. The ½ wavelength film has a function of rotating the vibration direction of linearly polarized light by 90 degree. The ½ wavelength film can be produced in the following manner. The composition is coated on a supporting substrate to satisfy the equation d=λ/2×Δn, in which d represents the thickness of the composition, λ represents the wavelength, and Δn represents the optical anisotropy. After attaining orientation of the polymerizable liquid crystal compound, the composition is polymerized with light to obtain the ½ wavelength film. The ¼ wavelength film has a function of converting linearly polarized light to circularly polarized light or converting circularly polarized light to linearly polarized light. In this case, the coated film of the composition is prepared to satisfy the equation d=λ/4×Δn. The thickness (d) of the polymer is adjusted in the following manner. In the method of diluting the composition with a solvent and then coating on a supporting substrate, a coated film having an intended thickness can be obtained by appropriately selecting the concentration of the composition, the coating method, and the coating conditions. A method using a liquid crystal cell is also preferably employed since a liquid crystal cell has an orientation film, such as polyimide. Upon placing the composition in a liquid crystal cell, the thickness of the coated film can be adjusted with the distance of the liquid crystal cell.

The polymer having twisted orientation is useful as a retardation film. In the case where the pitch of helix is 1/n of a wavelength (where n represents an average refractive index of the polymer), light having the wavelength is reflected according to Bragg's law and converted to circularly polarized light. The direction of the circularly polarized light depends on the direction of the helix, i.e., the steric configuration of the optically active compound. The direction of the circularly polarized light can be determined by appropriately selecting the steric configuration of the optically active compound. The polymer is useful as a circularly polarized light separation function device.

EXAMPLE

The invention will be described with reference to the following examples after describing measurement methods of properties. The invention is not construed as being limited to the examples. The ratios in all the compositions are in terms of percent by weight (% by weight).

The phase transition temperature was measured in the following manner. A specimen was placed on a hot plate of a melting point measuring apparatus equipped with a polarizing microscope, and the temperature was increased at a rate of 1° C. per minute to measure a temperature at which the liquid crystal phase is transferred. In the results of the examples, C represents crystals, N represents a nematic phase, Ch represents a cholesteric phase, I represents an isotropic liquid, and an NI point means the maximum temperature of a nematic phase or a temperature at which a nematic phase is transferred to an isotropic liquid. For example, "C50N63I" means that the specimen is transferred from crystals to a nematic phase at 50° C., and transferred from a nematic phase to an isotropic liquid at 63° C.

The adhesive tape peeling test was carried out according to JIS K5400, 8.5 Adhesiveness, 8.5.2 Crosscut Tape Test. That is, the adhesiveness was evaluated by the number of squares that were not peeled among 100 squares.

The pencil hardness was measured according to JIS K5400, 8.4 Pencil Scratch Test. The results are shown in terms of hardness of pencils.

The heat resistance test was carried out under conditions of 150° C. for 500 hours, and the result was evaluated by change of retardation. Polyamic acid (PIA5310, produced by Chisso Corp.) was coated on a glass substrate, which was then heated at 210° C. for 30 minutes to obtain a supporting substrate. The surface of polyimide formed through heating was rubbed with rayon cloth. A composition as a specimen was diluted with a mixed solvent of toluene and cyclopentanone (2/1 by weight) to prepare a solution having a concentration of 30% by weight. The solution was coated on the supporting substrate with a spin coater, and after heating at 70° C. for 3 minutes, the resulting coated film was irradiated with an ultraviolet ray at 60° C. for 10 seconds by using a superhigh pressure mercury lamp (250 W/cm). The resulting polymer was measured for retardation at 20° C. The polymer was heated to 150° C. for 500 hours, and then again measured for retardation at 20° C. The resulting two values were compared to evaluate the heat resistance. The retardation was measured according to the method disclosed in a known literature (H. Awaya, *Kobunshi Sozai no Henko Kenbikyo Nyumon* (Introduction to Polarizing Microscope for Polymer Materials), p. 94, published by Agne Gijutsu Center Co., Ltd. (2001)) and by using a Senarmont compensator. The wavelength used was 550 nm.

The optical anisotropy (Δn) was calculated in the following manner. The value of retardation (25° C.) of the polymer was measured according to the method for the heat resistance test. The thickness of the polymer (d) was also measured. The retardation is the product of Δn and d. Accordingly, the value of optical anisotropy was calculated from the relationship.

The orientation was observed with a polarizing microscope. The polymer was prepared on a TAC film (supporting substrate) having been subjected to a saponification treatment to have an acetylation degree of 2.9. The resulting specimen was held between two polarizing plates disposed to form crossed nicols. The kind of orientation was determined by the angle dependency of the intensity of transmitted light.

Example 1

Synthesis of Compound No. 1

(First Step)

A reaction mixture obtained by adding 20 g of 4-cyano-4'-hydroxybiphenyl, 20 g of ally bromide and 25 g of potassium carbonate to 250 mL of butanone was refluxed for 7 hours. Water was added to the reaction mixture, which was then separated. An organic layer was washed with water and dried over anhydrous magnesium sulfate. The solvent was distilled off to obtain a residue, which was purified by silica gel column chromatography using toluene as an elusion solvent and then subjected to recrystallization from ethanol to obtain 22 g of 4-allyloxy-4'-cyanobiphenyl.

4-(4-Allyloxybutyloxy)-4'-cyanobiphenyl was synthesized in the similar manner as in the first step of Example 1. The phase transition temperatures of the two compounds thus synthesized are shown below.

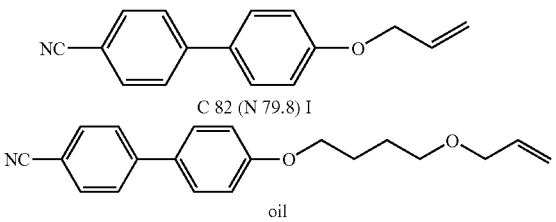

(Second Step)

20 g of m-chlorobenzoic acid was added to a reaction mixture obtained by dissolving 19 g of 4-allyloxy-4'-cyanobiphenyl in 150 mL of methylene chloride as divided into several times, and the mixture was stirred at room temperature for 24 hours. Insoluble matters thus deposited were removed by filtration, and water was added thereto. After separating the mixture, the organic layer was washed with a saturated aqueous solution of sodium hydrosulfite and then dried over anhydrous magnesium sulfate. The solvent was distilled off to obtain a residue, which was purified by silica gel column chromatography and then subjected to recrystallization from ethanol to obtain 13 g of 4-cyano-4'-glycidylbiphenyl.

The phase transition temperatures of 4-cyano-4'-glycidylbiphenyl and a compound prepared in the similar manner as in the second step of Example 1 are shown below.

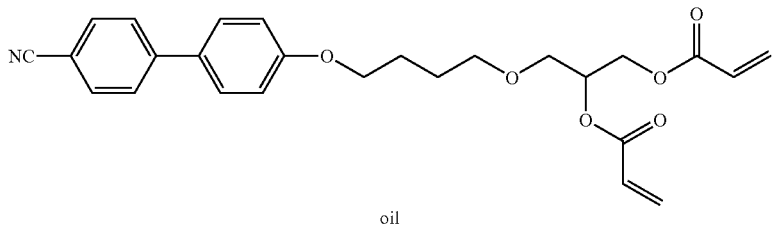

C 115 I

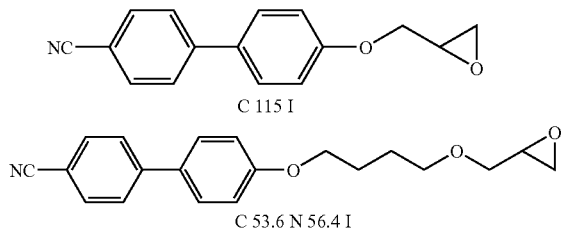

C 53.6 N 56.4 I (Third Step)

A reaction mixture obtained by adding 1 g of 4-cyano-4'-glycidylbiphenyl, 0.5 g of acrylic acid, 0.07 g of tetrabutylammonium bromide and 0.02 g of 2,6-di-t-butyl-p-cresol to 50 mL of toluene was refluxed under bubbling with air for 5 hours. 100 mL of chloroform and water was added to the mixture, which was then separated. The organic layer was dried over anhydrous magnesium sulfate. The solvent was distilled off to obtain an oily residue. 20 mL of dioxane and 1.2 g of dimethylaniline were added to the oily product, and the mixture was heated to 50° C., to which 0.8 g of acryloyl chloride was added dropwise, followed by stirring at the same temperature maintained for 2 hours. Toluene and water was added to the reaction mixture, which was then separated. The toluene layer was washed with sodium carbonate and water, and then dried over anhydrous magnesium sulfate. A residue obtained by distilling the solvent was purified by silica gel chromatography and recrystallization to obtain the compound No. 1.

The compound No. 5 was prepared in the similar manner as in the third step of Example 1. The phase transition temperatures and the natures of the compounds Nos. 1 and 5 are shown below.

No.1

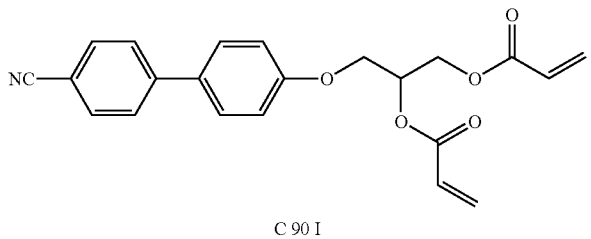

C 90 I

No.5 oil

Example 2

(First Step)

A reaction mixture containing 14 g of allyl(4-chlorobutyl) ether, 14 g of 4-hydroxybenzoic acid, 14 g of potassium carbonate and 50 mL of dimethylformamide was stirred at 90° C. for 3 hours. Water was added to the reaction mixture, which was then extracted with toluene. The toluene layer was well washed with water, and then toluene was distilled off. 20 g of sodium hydroxide, 50 mL of water and 200 mL of ethanol were added to the resulting residue, followed by refluxing for 2 hours. Ethanol was distilled off, and hydrochloric acid was added to make the reaction mixture acidic. The mixture was extracted with diethyl ether and dried over anhydrous magnesium sulfate. A residue obtained by distilling the solvent was recrystallized from a mixed solvent of ethanol and water to obtain 29 g of 4-(4-allyloxybutyloxy)benzoic acid.

Phase transition temperature: C 94 N 107 I.

The following benzoic acid derivatives were synthesized in the similar manner as in the first step of Example 2.

4-allyloxybenzoic acid
  (melting point: 164 to 165° C.)
4-(3-butenyloxy)benzoic acid
  (phase transition temperature: C 121 N 141.5 I)

(Second Step)

1.34 g of 4-(4-allyloxybutyloxy)benzoic acid and 0.46 g of 2,7-dihydroxy-9-methylfluorene were dissolved in 30 mL of methylene chloride, and the solution was cooled to 5° C., to which 0.01 g of dimethylaminopyridine and 1.15 g of 1-ethyl-3-(3-dimethylaminopropyl)carbodiimide hydrochloride were added, followed by stirring at room temperature for 12 hours. 50 mL of water was added to the mixture, which was then separated. The organic layer was dried over anhydrous magnesium sulfate. A residue obtained by distilling the solvent was purified by silica gel chromatography and recrystallized from a mixed solvent of ethanol and ethyl acetate to obtain 0.6 g of 2,7-(di(4-(4-allyloxybutyloxy)benzoyloxy)-9-methylfluorene.

The following compounds were synthesized in the similar manner as in the second step of Example 2. The phase transition temperatures of 2,7-(di(4-(4-allyloxybutyloxy)benzoyloxy)-9-methylfluorene and the compounds thus synthesized are shown below.

hydroxide solution, and then washed sequentially with a sodium hydrogen sulfite solution and a sodium hydrogen carbonate solution, followed by being dried over anhydrous magnesium sulfate. A residue obtained by distilling the solvent was purified by silica gel chromatography and recrystallized from a mixed solution of ethanol and ethyl acetate to obtain 0.56 g of 2,7-di(4-(4-diglycidyloxybutyloxy)benzoyloxy)-9-methylfluorene.

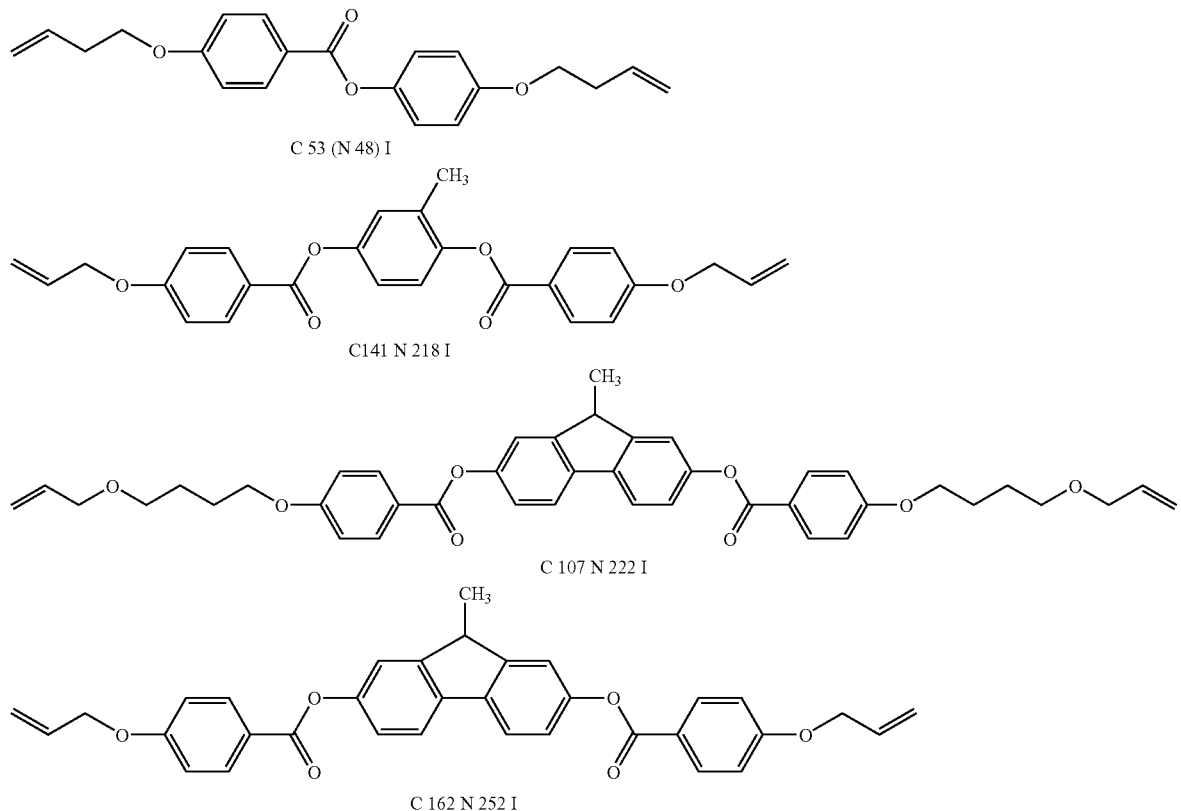

(Third Step)

0.5 g of m-chlorobenzoic acid was added to a reaction mixture containing 0.64 g of 2,7-(di(4-(4-allyloxybutyloxy)benzoyloxy)-9-methylfluorene and 10 mL of methylene chloride, and the mixture was stirred at room temperature for 2 days. The reaction mixture was washed with a 5% sodium The following compounds were synthesized in the similar manner as in the third step of Example 2. The phase transition temperatures of 2,7-di(4-(4-diglycidyloxybutyloxy)benzoyloxy)-9-methylfluorene and the compounds thus synthesized are shown below.

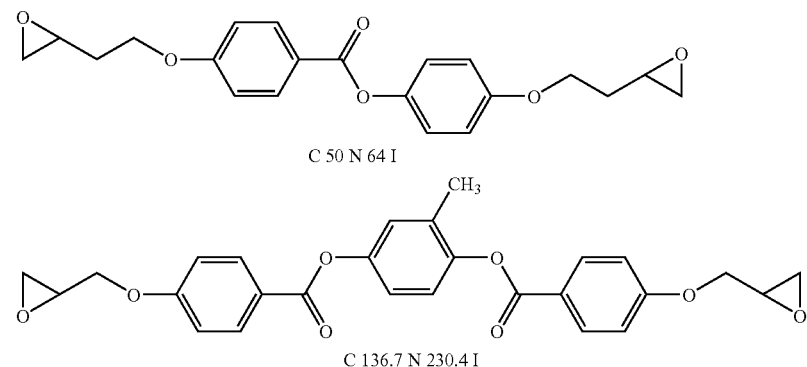

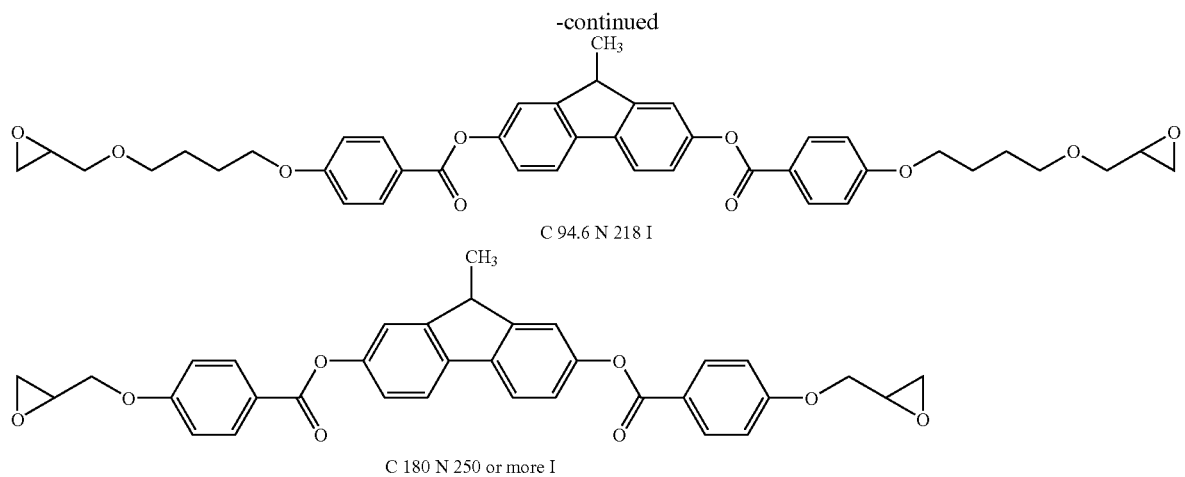

C 94.6 N 218 I

C 180 N 250 or more I (Fourth Step)

A reaction mixture obtained by adding 5 g of 2,7-di(4-(4-diglycidyloxybutyloxy)benzoyloxy)-9-methylfluorene, 5 g of acrylic acid, 0.1 g of tetrabutylammonium bromide, 0.2 g of magnesium hydroxide and 0.04 g of 2,6-di-t-butyl-p-cresol to 100 mL of toluene was refluxed under bubbling with air for 5 hours. 100 mL of chloroform and water was added to the mixture, which was then separated. The organic layer was dried over anhydrous magnesium sulfate. The solvent was distilled off to obtain an oily residue. 20 mL of dioxane and 2.4 g of dimethylaniline were added to the oily product, and the mixture was heated to 50° C., to which 1.8 g of acryloyl chloride was added dropwise, followed by stirring at the same temperature maintained for 2 hours. Toluene and water was added to the reaction mixture, which was then separated. The toluene layer was washed with a sodium carbonate aqueous solution, and then dried over anhydrous magnesium sulfate. A residue obtained by distilling the solvent was purified by silica gel chromatography and recrystallization to obtain the compound No. 71.

The compound No. 42 shown below was prepared in the similar manner as in the fourth step of Example 2. The phase transition temperatures and the natures of the compounds Nos. 42 and 56 are shown below.

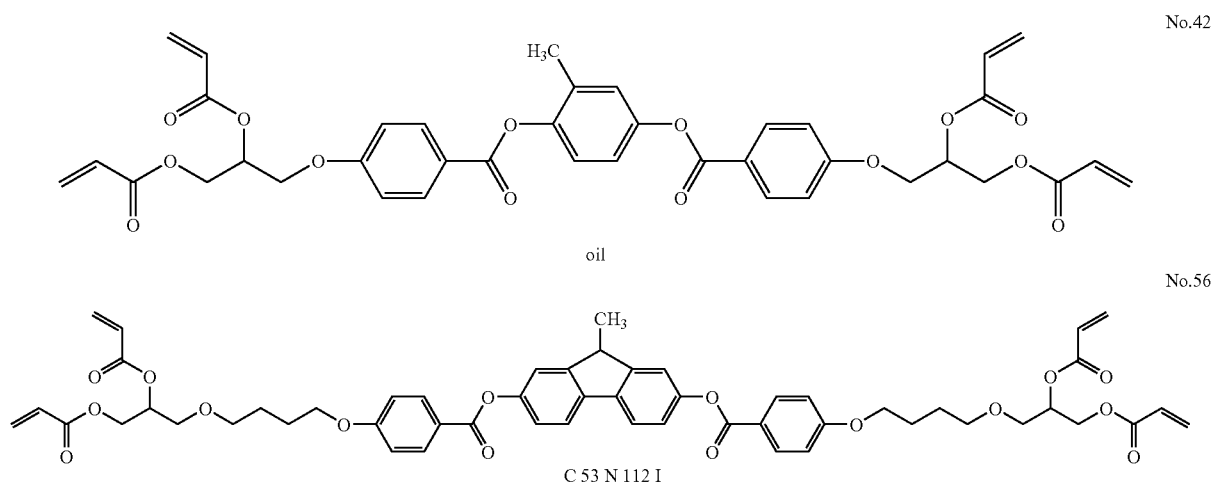

No.42 oil

No.56

C 53 N 112 I

Example 3

Example of Composition of Homogeneous Orientation

A composition (CL1) was prepared with 50% by weight of the compound No. 56 and 50% by weight of the compound (M1-2). The compound (M1-2) was synthesized by the method disclosed in JP-A-2003-238491. The composition had a nematic liquid crystal phase at room temperature and an NI point of 155° C. The compound No. 56 had good compatibility without phase separation. The composition (CL1) maintained a liquid crystal state at room temperature but was not immediately crystallized. The composition (CL1) was coated on a rubbed TAC film, and the coated film exhibited homogeneous orientation.

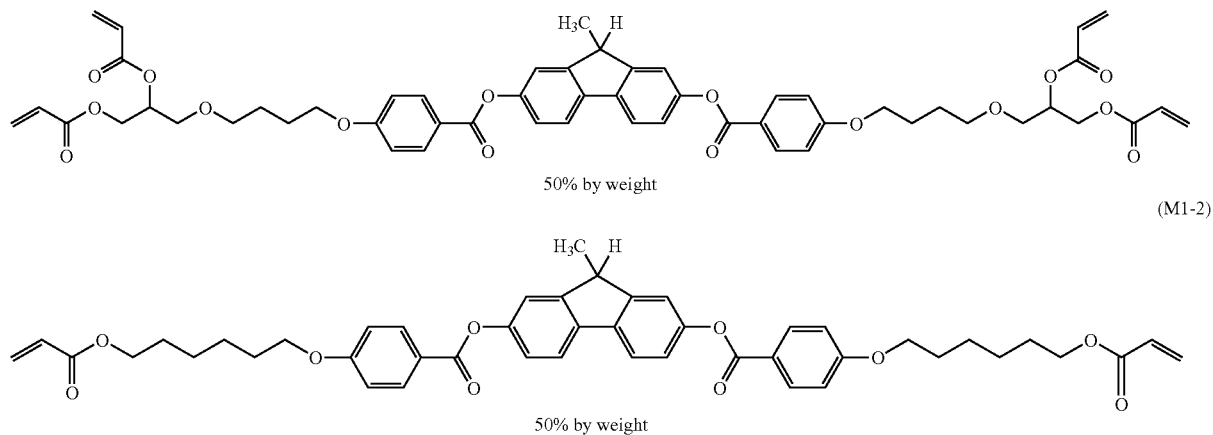

(No.56)

50% by weight (M1-2)

50% by weight

Example 4

Example of Composition Exhibiting Selective Reflection at Part of Visible Range (Wavelength: 350 to 750 nm)

A composition (CL2) was prepared with 70% by weight of the compound No. 56 and 30% by weight of the compound (M3-1). The compound (M3-1) was synthesized by the method disclosed in JP-A-2005-97281. The composition had a cholesteric liquid crystal phase at room temperature and a Ch-I transition point of 77° C. The compound No. 56 had good compatibility without phase separation. The composition (CL2) maintained a liquid crystal state at room temperature but was not immediately crystallized. The composition (CL2) was coated on a rubbed TAC film, and the coated film exhibited red selective reflection as viewed with eyes.

dissolving 10 g of the composition (CL1) and 0.3 g of Irgacure 907 (trade name) in 80 g of cyclopentanone was coated on the TAC film (supporting substrate) by using a microgravure coater. After coating, the coated film was allowed to stand at room temperature for 5 minutes to remove the solvent to make the liquid crystal phase oriented. While maintaining the room temperature, the coated film was irradiated with an ultraviolet ray for 10 seconds by using a high pressure mercury lamp (120 W/cm) in a nitrogen atmosphere to obtain a liquid crystal oriented film (F1). The homogeneous orientation of the composition was maintained after polymerization. The film had a pencil hardness of 3H. The change in retardation of the film under change in temperature (20 to 150° C.) was less than 3%, which indicated that the film had high heat resistance.

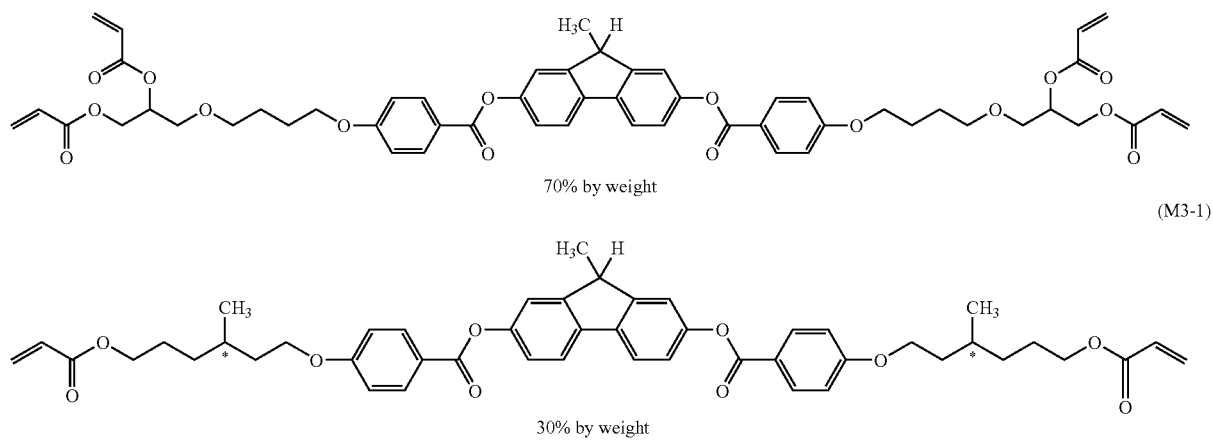

(No.56)

70% by weight (M3-1)

30% by weight

Example 5

Production of Oriented Film by Ultraviolet Ray Irradiation

A surface of a TAC film was rubbed with rayon cloth, and the TAC film was subjected to a saponification treatment to have an acetylation degree of 2.9. A solution obtained by A surface of a TAC film was rubbed with rayon cloth, and the TAC film was subjected to a saponification treatment to have an acetylation degree of 2.9. A solution obtained by dissolving 10 g of the composition (CL2) and 0.3 g of Irgacure 907 (trade name) in 80 g of cyclopentanone was coated on the TAC film (supporting substrate) by using a microgravure coater. After coating, the coated film was allowed to stand at room temperature for 5 minutes to remove the solvent to make the liquid crystal phase oriented. While maintaining room temperature, the coated film was irradiated with an ultraviolet ray for 10 seconds by using a high pressure mercury lamp (120 W/cm) in a nitrogen atmosphere to obtain a liquid crystal oriented film (F2). The Grandjean orientation of the composition was maintained after polymerization. The composition had good orientation property and good polymerizability with an ultraviolet ray. The film had a pencil hardness of 3H. The change in retardation of the film under change in temperature (20 to 150° C.) was not more than 3%, which indicated that the film had high heat resistance.

The evaluation results of the films are summarized in Table 2 below. It is understood from the results that (1) the polymers have high hardness, and (2) the polymers have high heat resistance.

TABLE 2

| | Evaluation Results | | |
|---|---|---|---|
| Film | Orientation state | Pencil hardness | Heat resistance |
| F1 | homogeneous orientation | 3H | <3% |
| F2 | twisted orientation (red selective reflection) | 3H | <3% |

What is claimed is:

1. A compound represented by the following general formula (1a) or (1b):

—OCO—, and arbitrary one —$CH_2$— may be replaced by —CH=CH— or —C≡C—, in which $Y^1$ and $Y^2$ each may be an optically active group; $A^1$, $A^2$, $B^1$ and $B^2$ each independently represents a group selected from 1,4-cyclohexylene, 1,4-phenylene, pyridine-2,5-diyl, pyrimidine-2,5-diyl, naphthalene-2,6-diyl, tetrahydronaphthalene-2,6-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl, 9,9-dichlorofluorene-2,7-diyl, and groups represented by the following formulae (K1), (K2) and (K3), provided that in the 1,4-phenylene group, an arbitrary hydrogen atom may be replaced by a fluorine atom or a chlorine atom, and arbitrary one or two hydrogen atoms may be replaced by a cyano group, a methyl group, a methoxy group, a hydroxyl group, a formyl group, an acetoxy group, an acetyl group, a trifluoroacetyl group, a difluoromethyl group or a trifluoromethyl group; $X^1$ and $X^2$ each independently represents a single bond, —COO—, —OCO—, —$OCH_2$—, —$CH_2O$—, —CONH—, —NHCO—, —CH=CH—COO—, —COO—HC=CH—, —$(CH_2)_2$—COO—, —OOC—$(CH_2)_2$—, —$(CH_2)_2$— or —C≡C—; m represents 0, 1 or 2, provided that when m is 2, two groups represented by $A^1$ may be the same groups or different groups, and two groups represented by $X^1$ may be the same groups or different groups; and G represents a hydrogen atom, a fluorine atom, a methyl group, a cyano group or a trifluoromethyl group, provided that a plurality of groups represented by G may be the same groups or different groups:

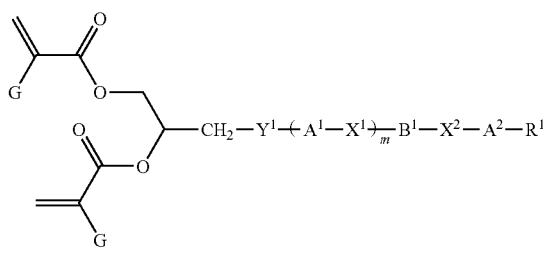

(1a)

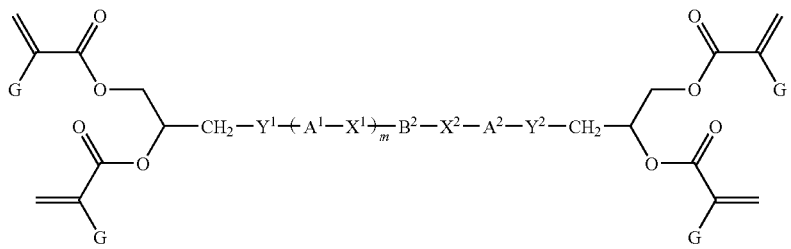

(1b)

wherein $R^1$ represents a hydrogen atom, a fluorine atom, a chlorine atom, —CN, —$NO_2$ or an alkyl group having from 1 to 20 carbon atoms, provided that in the alkyl group, an arbitrary hydrogen atom may be replaced by a fluorine atom or a chlorine atom, and arbitrary one or two —$CH_2$— groups may be replaced by —O—, —S—, —COO—, —OCO—, —CO—, —CH=CH— or —C≡C—, in which $R^1$ may be an optically active group; $Y^1$ and $Y^2$ each independently represents an alkylene group having from 1 to 20 carbon atoms, provided that in the alkylene group, an arbitrary hydrogen atom may be replaced by a fluorine atom or a chlorine atom, an arbitrary —$CH_2$— may be replaced by —O—, arbitrary one or two —$CH_2$— groups may be replaced by —COO— or

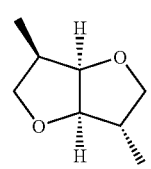

(K1)

-continued

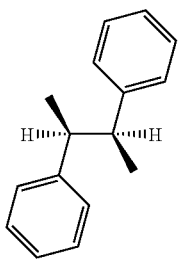
(K2)

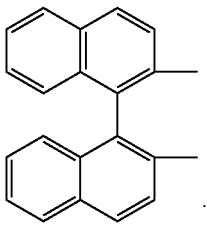
(K3)

2. The compound according to claim 1, wherein in the formulae (1a) and (1b), $R^1$ represents a fluorine atom, a chlorine atom, —CN, —NO$_2$, —OCF$_3$, an alkyl group having from 1 to 15 carbon atoms or an alkoxy group having from 1 to 15 carbon atoms; $Y^1$ and $Y^2$ each independently represents —O—, —(CH$_2$)$_r$—, —O—(CH$_2$)$_r$—, —(CH$_2$)$_r$—O—, —O—(CH$_2$)$_r$—O— and —O—(CH$_2$CH$_2$O)$_s$—, wherein r represents an integer of from 1 to 10, and s represents an integer of from 1 to 5; $A^1$, $A^2$, $B^1$ and $B^2$ each independently represents a group selected from 1,4-cyclohexylene, 1,4-phenylene, naphthalene-2,6-diyl, fluorene-2,7-diyl, 9-methylfluorene-2,7-diyl, 9-ethylfluorene-2,7-diyl, 9,9-dimethylfluorene-2,7-diyl, and groups represented by the following formulae (K1), (K2) and (K3), provided that in the 1,4-phenylene group, an arbitrary hydrogen atom may be replaced by a fluorine atom, arbitrary one hydrogen atom may be replaced by a methyl group, a trifluoromethyl group, a methoxy group, an acetoxy group or an acetyl group, and arbitrary two hydrogen atoms may be replaced by a trifluoroacetyl group; $X^1$ and $X^2$ each independently represents a single bond, —COO—, —OCO—, —CH=CH—COO—, —OOC—HC=CH—, —(CH$_2$)$_2$—COO—, —OOC—(CH$_2$)$_2$—, —(CH$_2$)$_2$— or —C≡C—; m represents 0 or 1; and G represents a methyl group, a fluorine atom or a hydrogen atom.

3. A compound represented by one of the following general formulae (3) to (6):

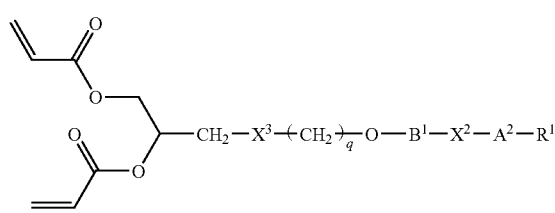
(3)

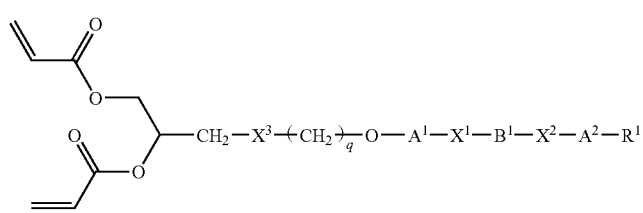
(4)

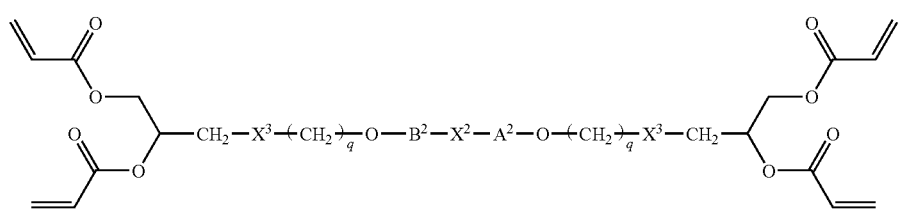
(5)

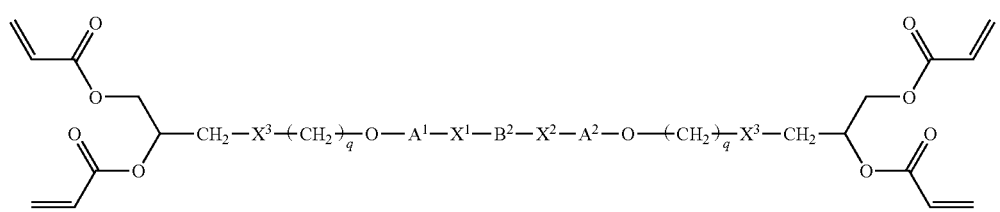
(6)

wherein R¹ represents —CN, —OCF₃, an alkyl group having from 1 to 10 carbon atoms or an alkoxy group having from 1 to 10 carbon atoms; A¹ and A² each independently represents 1,4-cyclohexylene, 1,4-phenylene, 2-fluoro-1,4-phenylene, 2,5-difluoro-1,4-phenylene, 2,6-difluoro-1,4-phenylene, 2-methyl-1,4-phenylene or 2-trifluoromethyl-1,4-phenylene; B¹ and B² each independently represents 1,4-cyclohexylene, 1,4-phenylene, naphthalene-2,6-diyl, fluorene-2,7-diyl, 9-methylfluorene-2,7-diyl, 9-ethylfluorene-2,7-diyl, 9,9-dimethylfluorene-2,7-diyl, 2-fluoro-1,4-phenylene, 2,3-difluoro-1,4-phenylene, 2,3,5,6-tetrafluoro-1,4-phenylene, 2-methyl-1,4-phenylene, 2-trifluoromethyl-1,4-phenylene, 2-methoxy-1,4-phenylene, 2-acetyl-1,4-phenylene or 2,3-ditrifluoromethyl-1,4-phenylene; X¹ and X² each independently represents a single bond, —COO—, —OCO—, —CH=CH—COO—, —OOC—HC=CH—, —(CH₂)₂—COO—, —OOC—(CH₂)2—, —(CH₂)₂— or —C≡C—; X³ represents a single bond or —O—; and q represents an integer of from 0 to 10, provided that a plurality of groups represented by X³ may be the same groups or different groups, and a plurality of integers represented by q may be the same or different.

4. The compound according to claim 3, wherein in the formulae (3) to (6), R¹ represents —CN, —OCF₃, an alkyl group having from 1 to 10 carbon atoms or an alkoxy group having from 1 to 10 carbon atoms; A¹ and A² each independently represents 1,4-cyclohexylene, 1,4-phenylene, 2-fluoro-1,4-phenylene or 2-methyl-1,4-phenylene; B¹ and B² each independently represents 1,4-cyclohexylene, 1,4-phenylene, 9-methylfluorene-2,7-diyl, 9,9-dimethylfluorene-2,7-diyl, 2-fluoro-1,4-phenylene, 2-methyl-1,4-phenylene, 2-trifluoromethyl-1,4-phenylene or 2,3-ditrifluoromethyl-1,4-phenylene; X¹ and X² each independently represents a single bond, —COO— or —OCO—; X³ represents a single bond or —O—; and q represents an integer of from 0 to 10.

5. The compound according to claim 3, wherein the compound is represented by the formula (3), and in the formula (3), R¹ represents —CN; A² represents 1,4-phenylene; B¹ represents 1,4-phenylene; X² represents a single bond; X³ represents a single bond or —O—; and q represents an integer of from 0 to 10.

6. The compound according to claim 3, wherein the compound is represented by the formula (5), and in the formula (5), A² represents 1,4-phenylene; B² represents 1,4-phenylene; X² represents —COO—; X³ represents a single bond or —O—; and q represents an integer of from 0 to 10.

7. The compound according to claim 3, wherein the compound is represented by the formula (6), and in the formula (6), A¹ and A² each represents 1,4-phenylene; B² represents 1,4-phenylene, 9-methylfluorene-2,7-diyl or 2-methyl-1,4-phenylene; X¹ and X² each independently represents —COO— or —OCO—; X³ represents a single bond or —O—; and q represents an integer of from 0 to 10.

8. A composition comprising, as a first component, at least one of the compound according to claim 1.

9. A composition comprising, as a first component, at least one of the compound according to claim 3.

10. The composition according to claim 9, wherein the composition further comprises, as a second component, a polymerizable compound that is different from the compounds according to claim 1.

11. The composition according to claim 10, wherein the second component is at least one compound selected from the group consisting of compounds represented by the following formulae (M1), (M2) and (M3):

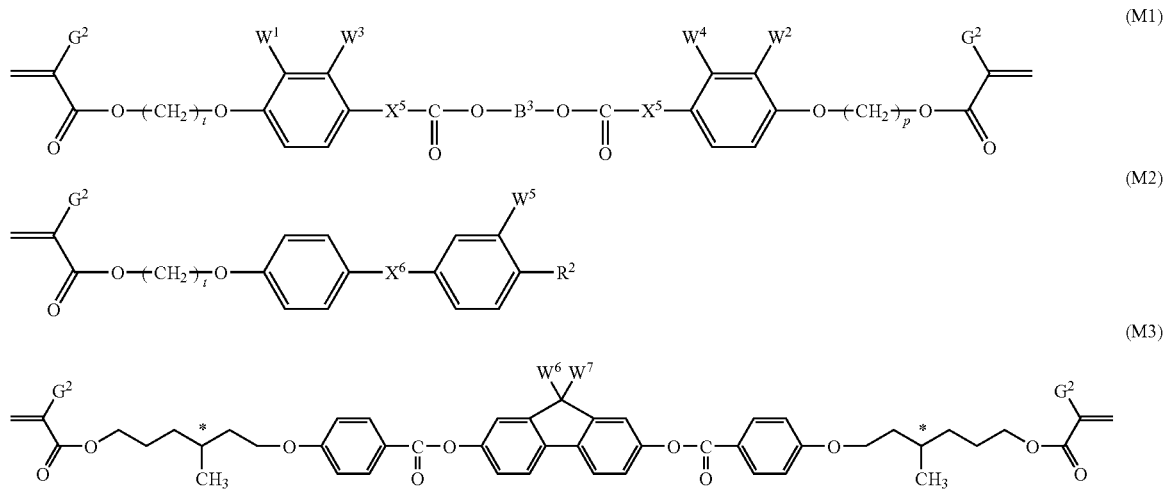

wherein B³ represents 1,4-phenylene, 2-fluoro-1,4-phenylene, 2-methyl-1,4-phenylene, 2-trifluoromethyl-1,4-phenylene, 2,3-ditrifluoro-1,4-phenylene, naphthalene-2,6-diyl, 9-methylfluorene-2,7-diyl, 9-ethylfluorene-2,7-diyl or 9,9-dimethylfluorene-2,7-diyl; R² represents a fluorine atom, —OCF₃, —CN, an alkyl group having from 1 to 20 carbon atoms or an alkoxy group having from 1 to 20 carbon atoms; X⁵ each independently represents a single bond, —(CH₂)₂— or —C≡C—; X⁶ represents a single bond, —COO—, —OCO—, —CH=CH—COO—, —OOC—HCαCH— or —C≡C—; p and t each independently represents an integer of from 1 to 20; G² represents a hydrogen atom, a fluorine atom, a methyl group or a trifluoromethyl group; W¹, W², W³, W⁴ and W⁵ each independently represents a hydrogen atom or a fluorine atom; and W⁶ and W⁷ each independently represents a hydrogen atom or a methyl group, provided that a carbon atoms attached with an asterisk is a asymmetric carbon atom, a plurality of groups represented by X⁵ may be the same groups or different groups, a plurality of integers represented by t may be the same or different, and a plurality of groups represented by $G^2$ may be the same groups or different groups.

12. The composition according to claim 11, wherein the composition comprises, as the first component, at least one compound selected from the group consisting of the compound represented by the formula (6) according to claim 3, in the formula (6), $A^1$ and $A^2$ each represents 1,4-phenylene; $B^2$ represents 1,4-phenylene, 9-methylfluorene-2,7-diyl or 2-methyl-1,4-phenylene; $X^1$ and $X^2$ each independently represents —COO— or —OCO—; $X^3$ represents a single bond or —O—; and q represents an integer of from 0 to 10, and as the second component, at least one compound selected from the group consisting of the compound represented by the formula (M1), in the formula (M1), $B^3$ represents 1,4-phenylene, 2-methyl-1,4-phenylene, 2,3-ditrifluoro-1,4-phenylene, 9-methylfluorene-2,7-diyl or 9,9-dimethylfluorene-2,7-diyl; $X^5$ represents a single bond or —(CH$_2$)$_2$—; p and t each independently represents an integer of from 1 to 20; $G^2$ represents a hydrogen atom; and $W^1$, $W^2$, $W^3$ and $W^4$ each independently represents a hydrogen atom or a fluorine atom, and a content of the first component is from 20 to 80% by weight, and a content of the second component is from 20 to 80% by weight, with respect to a total amount of the first and second components being 100% by weight.

13. The composition according to claim 11, wherein the composition comprises, as the first component, at least one compound selected from the group consisting of the compound represented by the formula (6) according to claim 3, in the formula (6), $A^1$ and $A^2$ each represents 1,4-phenylene; $B^2$ represents 1,4-phenylene, 9-methylfluorene-2,7-diyl or 2-methyl-1,4-phenylene; $X^1$ and $X^2$ each independently represents —COO— or —OCO—; $X^3$ represents a single bond or —O—; and q represents an integer of from 0 to 10, and as the second component, at least one compound selected from the group consisting of the compound represented by the formula (M3), in the formula (M3), $G^2$ represents a hydrogen atom; and $W^6$ and $W^7$ each independently represents a hydrogen atom or a methyl group, and a content of the first component is from 20 to 80% by weight, and a content of the second component is from 20 to 80% by weight, with respect to a total amount of the first and second components being 100% by weight.

14. A polymer obtained by polymerizing the compound according to claim 1.

15. A polymer obtained by polymerizing the composition according to claim 8.

16. A molded article having optical anisotropy comprising the polymer according to claim 14.

17. A liquid crystal display device comprising the molded article according to claim 16.

18. Use of the polymer according to claim 14 as a molded article having optical anisotropy.

19. A molded article having optical anisotropy comprising the polymer according to claim 15.

20. A liquid crystal display device comprising the molded article according to claim 19.

21. Use of the polymer according to claim 15 as a molded article having optical anisotropy.

* * * * *